(12) United States Patent
Okuda et al.

(10) Patent No.: US 7,221,064 B2
(45) Date of Patent: May 22, 2007

(54) POWER CIRCUIT FOR BATTERY

(75) Inventors: Tatsuya Okuda, Tokyo (JP); Takahiro Urakabe, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/312,685

(22) Filed: Dec. 21, 2005

(65) Prior Publication Data

US 2006/0097579 A1    May 11, 2006

Related U.S. Application Data

(62) Division of application No. 10/505,211, filed as application No. PCT/JP03/14664 on Nov. 18, 2003, now Pat. No. 7,023,107.

(30) Foreign Application Priority Data

Jan. 24, 2003    (JP) ............................. 2003-015476

(51) Int. Cl.
*H02G 3/00* (2006.01)
*H02J 7/00* (2006.01)

(52) U.S. Cl. ..................... 307/10.1; 320/104

(58) Field of Classification Search ................ 320/104, 320/134, 163; 307/10.1, 18, 29, 38, 43; 318/139
See application file for complete search history.

(56) References Cited

U.S. PATENT DOCUMENTS

| 5,412,293 | A | 5/1995 | Minezawa et al. ........... 318/376 |
|---|---|---|---|
| 5,986,436 | A | 11/1999 | Liu ............................. 320/140 |
| 6,202,615 | B1 | 3/2001 | Pels et al. ................. 123/179.3 |
| 6,316,907 | B1 * | 11/2001 | Botti et al. .................. 320/104 |
| 6,323,608 | B1 * | 11/2001 | Ozawa ........................ 318/139 |
| 6,420,793 | B1 | 7/2002 | Gale et al. ..................... 290/34 |
| 6,426,608 | B2 * | 7/2002 | Amano et al. ............... 320/163 |
| 6,605,921 | B2 | 8/2003 | Osada et al. ................. 320/104 |
| 6,982,499 | B1 * | 1/2006 | Kachi et al. ................... 307/75 |
| 6,989,653 | B2 * | 1/2006 | Iwata et al. .................. 320/134 |
| 7,023,107 | B2 * | 4/2006 | Okuda et al. .............. 307/10.1 |

FOREIGN PATENT DOCUMENTS

JP    7-95701    4/1995

(Continued)

OTHER PUBLICATIONS

Machine translation of JP-2002218667.*

*Primary Examiner*—Pia Tibbits
(74) *Attorney, Agent, or Firm*—Leydig, Voit & Mayer, Ltd.

(57) ABSTRACT

A power circuit for a battery for, even when an idle-stop operation is continuously performed, preventing reduction of an electric power supplied to a motor at start-up to obtain a set engine rpm. The power circuit includes a series-connected power supply in which a battery having a load and a capacitor group are connected in series with each other, a DC/DC converter for shifting electric power between the battery and the capacitor group, and between the battery and the load, and a controller for controlling the DC/DC converter. The controller detects the voltage of the capacitor group, and when the voltage detected is lower than a first threshold voltage, controls the DC/DC converter so that the capacitor group is charged with electricity.

7 Claims, 24 Drawing Sheets

FOREIGN PATENT DOCUMENTS

| | | | |
|---|---|---|---|
| JP | 10184506 | * | 7/1998 |
| JP | 10191576 | * | 7/1998 |
| JP | 2000-354303 | | 12/2000 |
| JP | 2001136735 | * | 5/2001 |
| JP | 2002-218667 | | 8/2002 |
| JP | 2002-330545 | | 11/2002 |

* cited by examiner

POWER CIRCUIT FOR BATTERY

TECHNICAL FIELD

The present invention relates to a power circuit for a battery, and more particularly to a power circuit for a battery which is installed in a vehicle such as an automobile to be used therein.

BACKGROUND ART

In a conventional power circuit for a battery, in order to reduce a capacity of a capacitor while ensuring an output electric power in start-up and power-running of an electric motor, a capacitor (or a high output battery having a small capacity) is connected in series with a battery of 12 V, and a DC/DC converter having a small capacity is added for the purpose of shifting an electric energy between the capacitor and the battery. In this power circuit for a battery, the DC/DC converter is operated for boosting in power running of the electric motor, whereby a desired output can be obtained with the capacitor having a relatively small capacity (or a battery having a relatively small capacity) (refer to JP 2002-218667 A (FIG. 3) for example).

In the conventional power circuit for a battery, there is a problem in that if an idle-stop operation (stop/start-up operation) is continuously carried out, then the recharging for a capacitor group connected in series with a battery group becomes insufficient, so that it becomes impossible to supply a sufficient electric power to a motor through an inverter, and hence a predetermined start-up operation by the motor of a vehicle cannot be carried out. A predetermined start-up operation means an operation for increasing the rpm of an engine from a stop state to an idle running state (engine rpm of about 800) with the motor.

In addition, there arises a problem in that a sufficient motor output can not be obtained due to insufficiency in voltage of the capacitor, and hence the start-up by the motor can not be carried out.

In addition, if the idle-stop operation is continuously carried out, then a sufficient period of time cannot be secured to recharge the capacitor with electricity. Thus, the capacitor voltage at the start-up operation takes various values, and the start-up operation is carried out in this state. Then, there arises a problem in that if the DC/DC converter is operated with a fixed output independently of the capacitor voltage, then the efficiency of the overall battery drive circuit system including a battery, a capacitor, and a DC/DC converter deteriorates depending on the capacitor voltage values. The deterioration of the efficiency causes an increase in a quantity of heat generation by the overall system. In particular, there is a concern about reduced life of the capacitor due to rise in temperature caused by the heat generation, and the heating of other apparatuses.

In addition, due to internal resistances that exist in the capacitor and the battery, there is a possibility that in outputting a large electric power at the engine restart-up or the like, a voltage drop due to the internal resistance exerts adverse influences on other on-vehicle apparatuses. In particular, when a charge voltage of the capacitor is low or a state of charge (SOC) of the battery is low, there is a problem in that a battery current required for restart-up of an engine is increased to decrease a battery output voltage.

In regeneration of energy, a series-connected body of the battery and the capacitor is charged with the energy generated by the electric motor. The permissible output electric power density of a lead acid battery is low, about 100 to 200 W/kg, and allowable input electric power density is even lower. For this reason, charge current during regeneration is determined on the basis of the allowable input current of the battery. Note that the allowable input electric power density of the battery is proportional to the allowable input current since the voltage of the battery is nearly fixed. Thus, the high speed charging characteristics of the capacitor can not be utilized, and hence it is necessary to limit the regeneration output of the electric motor.

DISCLOSURE OF THE INVENTION

The present invention is made to solve the above-mentioned problems, and it is an object of the present invention to provide a power circuit for a battery which is capable of, even when an idle-stop operation is continuously performed, preventing reduction of an electric power supplied to a motor at start-up to obtain a predetermined engine rpm.

In addition, it is a second object of the present invention to obtain a power circuit for a battery which is capable of regenerating an instantaneous large energy generated by an electric motor during, for example, breaking on a vehicle, without damaging a battery.

A power circuit for a battery according to the present invention includes: a first energy storage source; a second energy storage source connected in series with the first energy storage source; a DC/DC converter for shifting an electric power between the first energy storage source and the second energy storage source; and control means for controlling the DC/DC converter.

The control means of the present invention detects a voltage of the energy storage source that is disposed on a high voltage side, from among the first and second energy storage sources of the series-connected power supply. When the detected voltage is lower than a predetermined first threshold voltage, the energy storage source disposed on the high voltage side is charged with electricity by the DC/DC converter. Thus, even when the idle-stop operation is continuously carried out, it is possible to prevent reduction of the electric power supplied to the motor at start-up, and hence it is possible to obtain the predetermined engine rpm.

In addition, the power circuit for a battery of the present invention further includes an electric power conversion circuit for shifting an electric power between an electric motor connected to an axle of a vehicle, and the first and second energy storage sources connected in series with each other. When the first and second energy storage sources are charged with the regenerative electric power of the electric motor through the electric power conversion circuit, the control means controls the DC/DC converter so that an input current to the first energy storage source becomes equal to or smaller than an allowable input current of the first energy storage source. Hence, it is possible to increase a charge electric power for a battery and a capacitor.

BEST MODE FOR CARRYING OUT THE INVENTION

EMBODIMENT 1

Figure 1:
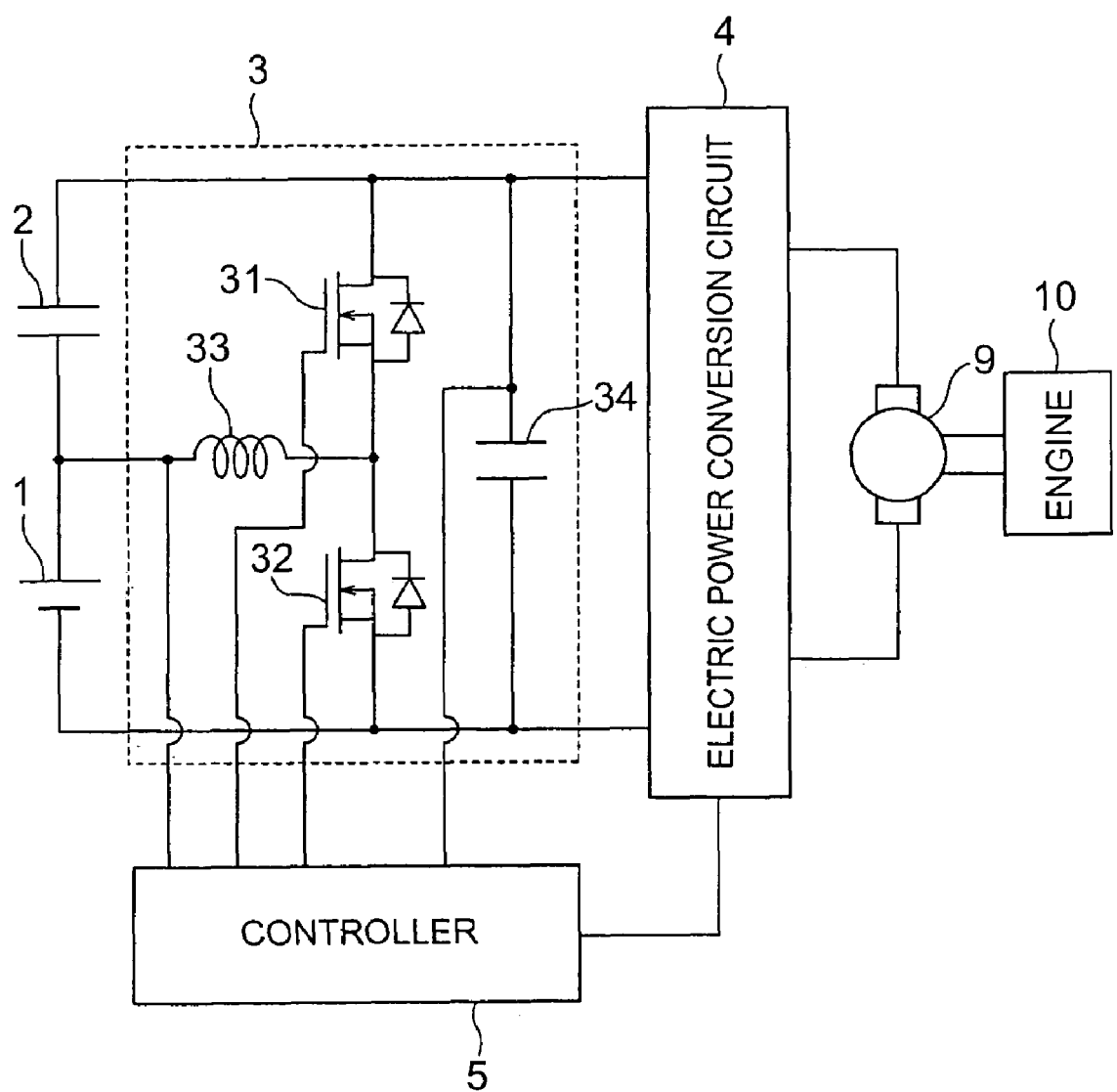
FIG. 1 is a circuit diagram showing a configuration of a power circuit for a battery according to the present invention.

FIG. 1 is a circuit diagram showing a configuration of a power circuit for a battery according to Embodiment 1 of the present invention. As shown in the figure, a battery (first battery group) 1 and a capacitor group 2 as a second battery group are connected in series with each other to constitute a series-connected power supply. The capacitor group is constituted by capacitors each having a large capacity. For example, an electrical double layer capacitor, an aluminum electrolytic capacitor or the like can be used in the capacitor group. While not illustrated in FIG. 1, an electrical load (not shown; refer to Patent Document 1) such as an on-vehicle apparatus is connected to the battery 1. Here, in the following description, it is supposed that the battery 1 is an energy storage source, disposed on a low voltage side, of the above-mentioned series-connected power supply, and the capacitor group 2 is an energy storage source, disposed on a high voltage side, of the above-mentioned series-connected power supply. Reference numeral 3 designates a DC/DC converter inserted between the battery 1 and the capacitor group 2. The DC/DC converter includes a MOSFET (switching element) 31 as an upper arm switch, a MOSFET (switching element) 32 as a lower arm switch, an inductor 33, and a smoothing capacitor 34. Reference numeral 4 designates an electric power conversion circuit connected between both terminals of the series-connected pair of the battery 1 and capacitor group 2. The electric power conversion circuit 4 carries out energy shift between the energy of the battery 1 and the capacitor group 2, and the energy of an electric motor (motor) 9. Reference numeral 10 designates an engine. The engine 10 is directly connected to the electric motor 9 or is mechanically connected to the electric motor 9 through a belt or the like to effect power transmission between the engine 10 and the electric motor 9. Reference numeral 5 designates a controller for issuing an output command signal to the DC/DC converter 3. The controller 5 issues a command signal to the MOSFET 31 and the MOSFET 32 in accordance with a voltage across the terminals of the battery 1, a voltage across the terminals of the smoothing capacitor 34, and an input current to the electric power conversion circuit 4.

Note that while various kinds of configurations are conceivable with respect to the configuration of the DC/DC converter 3 in addition to the configuration shown in FIG. 1, any configuration may be adopted as long as an electric power can be basically transferred between the battery 1 and the capacitor group 2. In addition, while the MOSFETs 31 and 32 are used in the DC/DC converter 3, a semiconductor device such as an IGBT or a bipolar transistor may also be used.

Also, while not illustrated in FIG. 1, internal resistances exist in the battery 1 and the capacitor group 2, respectively. Thus, if a large current is caused to flow through the battery 1 and the capacitor group 2, then voltage drops occur due to these internal resistances, and a voltage obtained by subtracting these voltage drops from a total voltage of the battery 1 and the capacitor group 2 is applied to the electric power conversion circuit 4.

Next, an operation will herein after be described. The present invention relates to a method of controlling the DC/DC converter 3. Hereinafter, the present invention will be described by giving a certain one condition as an example. The battery 1 has an output voltage of 12 V and an internal impedance of 8 mΩ. The capacitor group 2 is a capacitor block in which electrical double layer capacitors each having a withstand voltage of 2.5 V, an internal impedance of 8 mΩ, and an electrostatic capacity of 100 Fare connected, with three capacitors in parallel and four capacitors in series. Thus, a maximum voltage of the capacitor group 2 is 10 V. At the start-up, a maximum voltage of 22 V obtained by adding the voltage 12 V of the battery 1 to the maximum voltage 10 V of the capacitor group 2 is applied to the electric power conversion circuit 4. The reason for this is to make the input voltage of the electric power conversion circuit 4 be equal to or higher than the battery voltage at start-up to provide a high output, and to increase a vehicle speed using only the electric motor 9 until the rpm reaches the predetermined motor rpm (about 800 idle rpm in engine rpm and about 2,000 rpm in motor rpm).

Figure 2:
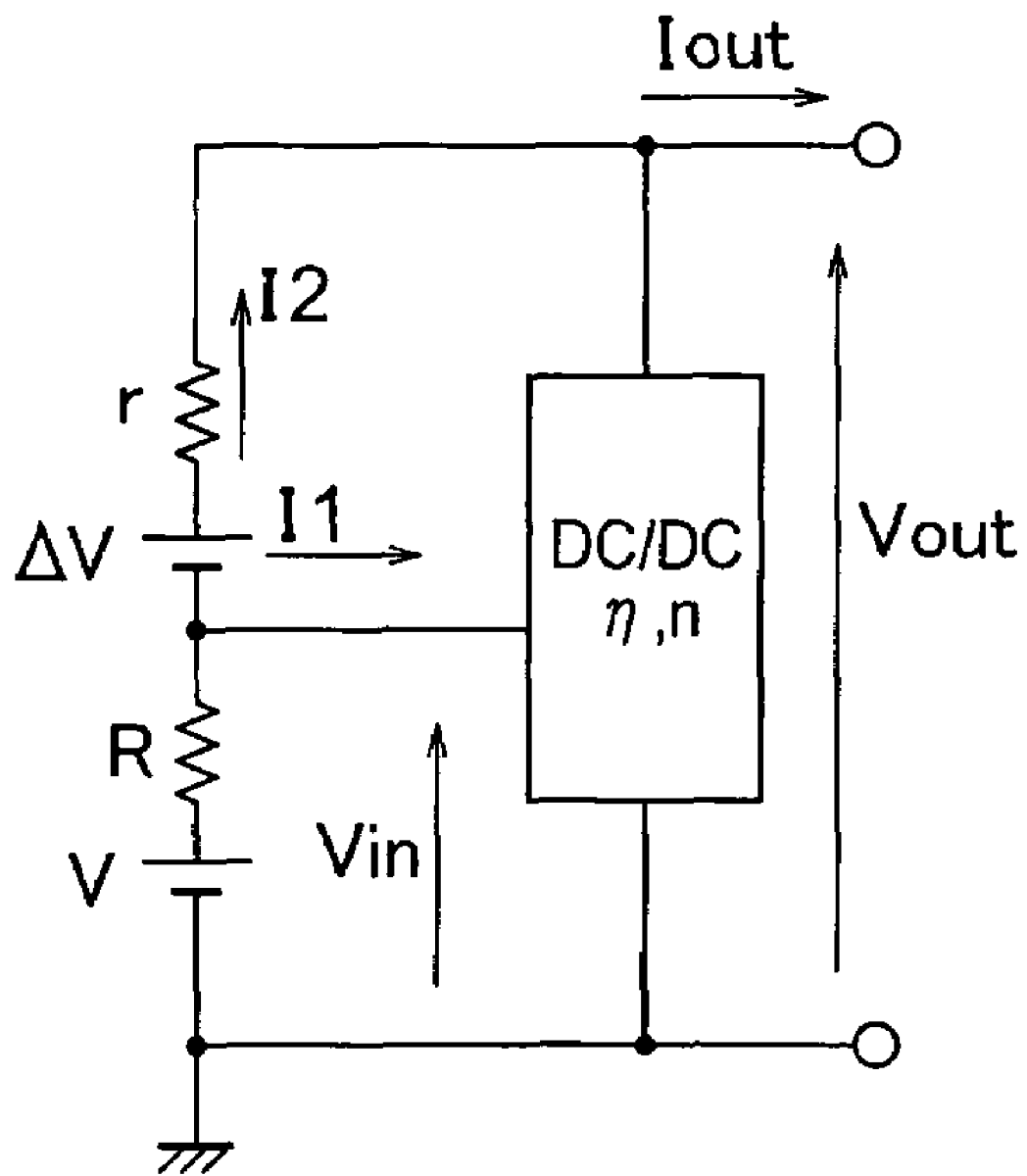
FIG. 2 is an explanatory diagram showing a calculation model for determining a control condition for a DC/DC converter provided in the power circuit for a battery according to the present invention.

FIG. 2 shows a calculation model for determining a control condition for the DC/DC converter 3 of the present invention. Since an operation time at start-up is so short as to be about 0.3 seconds, the capacitor group 2 is regarded as a power source, and a transient change in the capacitor voltage is ignored. In the figure, reference symbol η designates efficiency. Then, it is supposed that the efficiency η is changed within the range of 0.975 to 0.9 when the output voltage of the DC/DC converter 3 is in the range of 0.5 to 2.0 kW. Also, reference symbol n designates a boosting ratio, reference symbol ΔV designates a capacitor voltage of the capacitor group 2, reference symbol r designates an internal resistance of the capacitor, reference symbol V designates a battery voltage of the battery 1, and reference symbol R designates an internal resistance of the battery.

Equations obtained from the calculation model are expressed as follows.

$$Vin = \frac{Vout}{n} \quad (1)$$

$$Idc = \frac{\eta}{n} I_1 \quad (2)$$

$$R(I_1 + I_2) + Vin = V \quad (3)$$

$$Iout = Idc + I_2 \quad (4)$$

$$Pdc = Idc Vout \quad (5)$$

$$R(I_1 + I_2) + rI_2 + Vout = V + \Delta V \quad (6)$$

By solving Equations 1 to 6, it is possible to derive a relationship between the charge voltage (an accumulated voltage in the figure) and the output voltage (Vout, i.e., the input voltage to the electric power conversion circuit 4) of the capacitor group 2 for each output of the DC/DC converter 3. The output condition is 4 kW at which a predetermined motor output of the electric motor 9 can be obtained.

Figure 3:
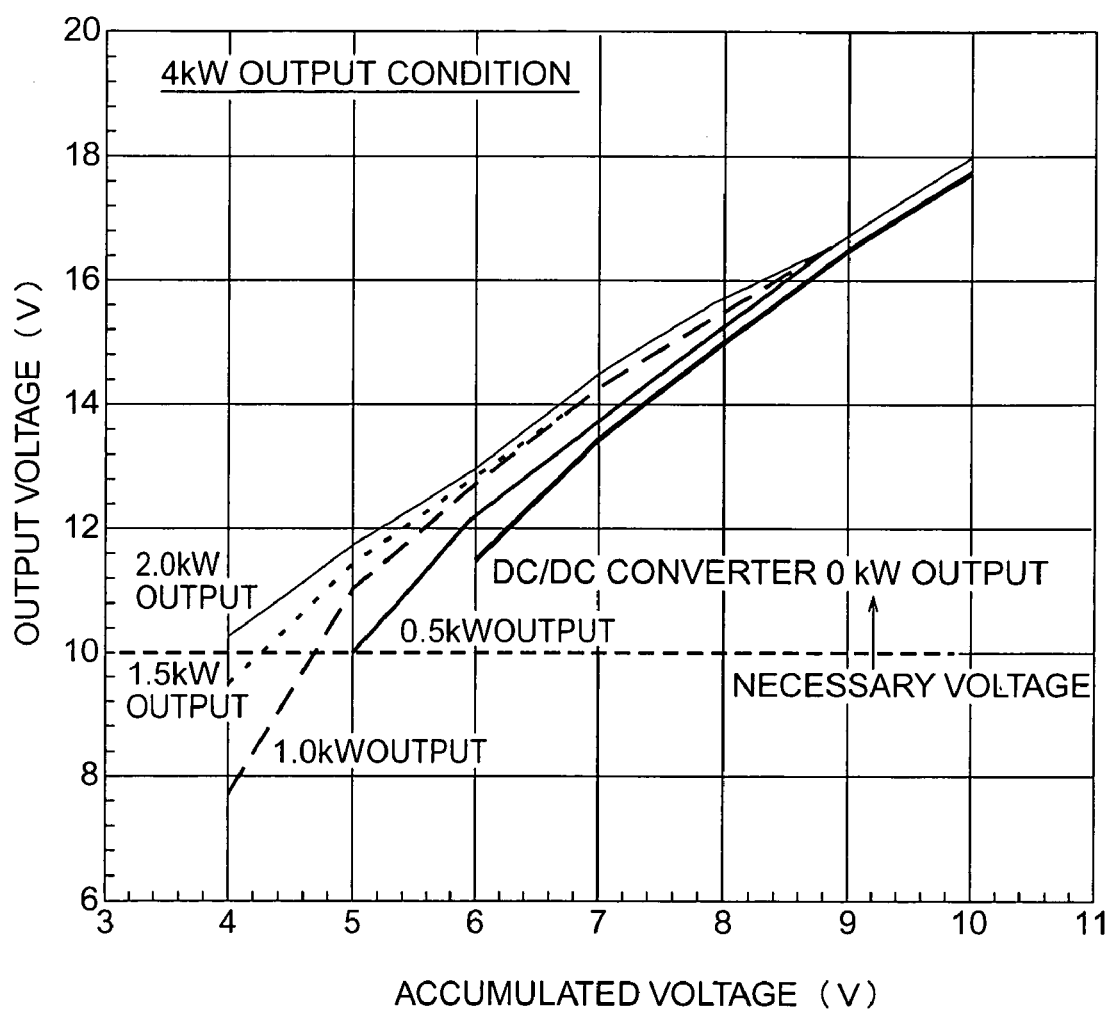
FIG. 3 is an explanatory diagram showing a relationship between a charge voltage and an output voltage of a capacitor group for each output of a DC/DC converter provided in the power circuit for a battery according to the present invention.

FIG. 3 shows a relationship between the charge voltage and the output voltage of the capacitor group 2 for each output of the DC/DC converter 3. In order to achieve the predetermined start-up operation as described above, an output voltage (the input voltage to the electric power conversion circuit 4) of equal to or higher than 10 V is required because as the motor rpm increases upon start-up, when the voltage is low, the current can not be caused to flow through the electric motor 9 due to a back electromotive force generated by the electric motor 9 itself and hence it becomes impossible to obtain the motor output. In addition, in Embodiment 1 of the present invention, a maximum output electric power of the DC/DC converter 3 is 2 kW. From FIG. 3, it is understood that when the accumulated voltage is lower than 4 V, it is impossible to obtain the output voltage of equal to or higher than 10 V. In addition, from the figure, it is also understood that when the accumulated voltage is 4 V, an output of 2 kW is required for the DC/DC converter 3.

Figure 4:
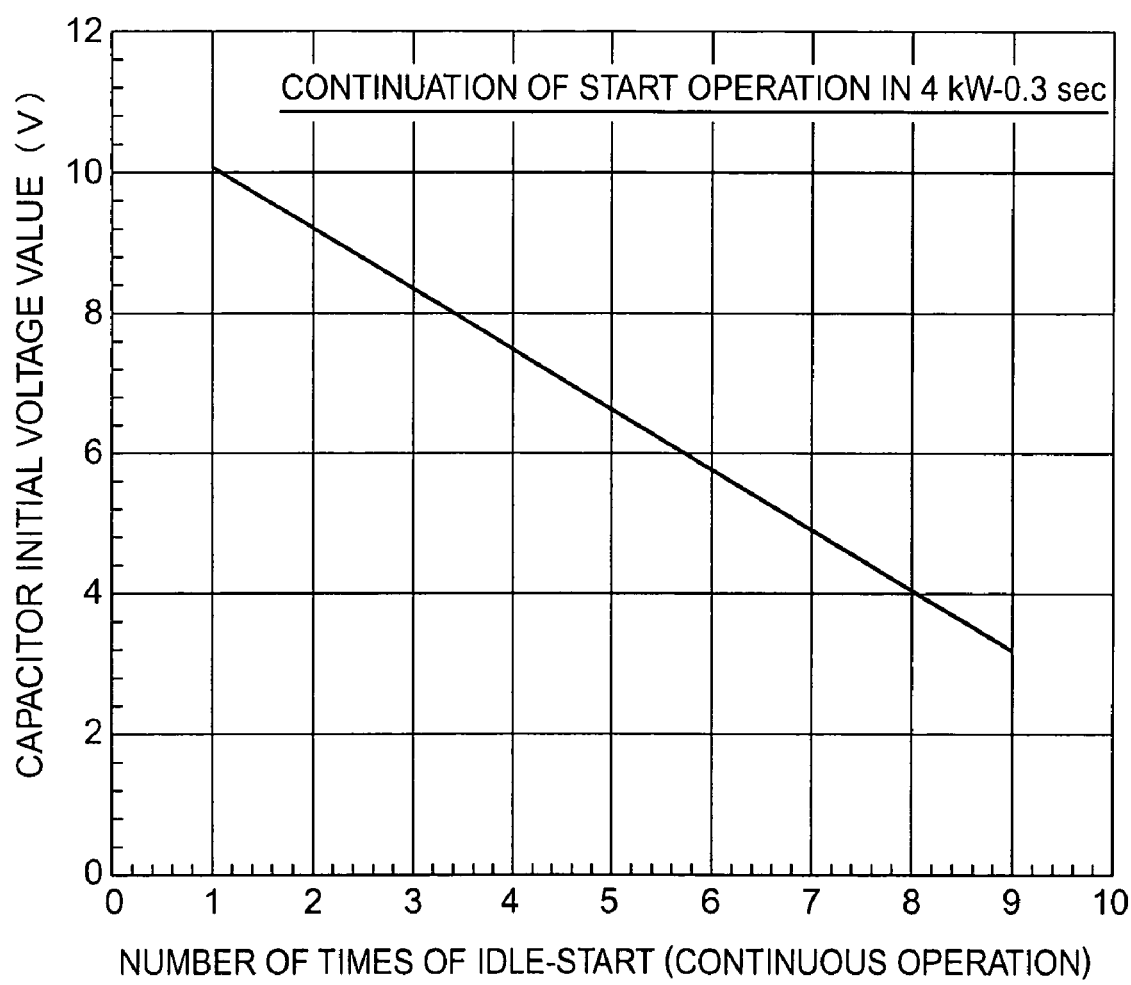
FIG. 4 is an explanatory diagram showing a relationship between a capacitor initial voltage value and the number of times of idle-start (continuous operation) in a conventional power circuit for a battery.

As described above, in Embodiment 1, it is understood that when the accumulated voltage is lower than 4 V, it is impossible to obtain the predetermined output (corresponding to 10 V or more, i.e., 4 kW). In Embodiment 1, the DC/DC converter 3 is operated for boosting by utilizing a period of time from idle-stop to restart to thereby charge the capacitor group 2 with electricity, or the capacitor group 2 is charged with electricity by utilizing the electric power generated from the electric motor 9 during traveling of the vehicle. The charge voltage at this time is about 10 V which is near the withstand voltage. When the capacitor group 2 is charged with electricity using the DC/DC converter 3, a period of time required for the charging is about several seconds. However, when the stop/start-up operation is continuously carried out, since it becomes impossible to secure sufficient time to charge the capacitor group 2 with electricity, the capacitor voltage gradually decreases. Thus, eventually, the capacitor voltage becomes insufficient, and hence a predetermined motor output can not be obtained. FIG. 4 shows a relationship between the number of times of idle-stop operation and an initial voltage value of the capacitor group 2 when the idle-stop operation is continuously carried out from a fully charged state of the capacitor without recharging. This relationship represents the calculation results when an electric power of 4 kW is continuously outputted to the electric power conversion circuit 4 for a period of time of 0.3 seconds. At this time, the DC/DC converter 3 controls its output so that the efficiency of the system constituted by the battery 1, the capacitor group 2, and the DC/DC converter 3 becomes maximum. This maximum efficiency control will be described later.

Figure 5:
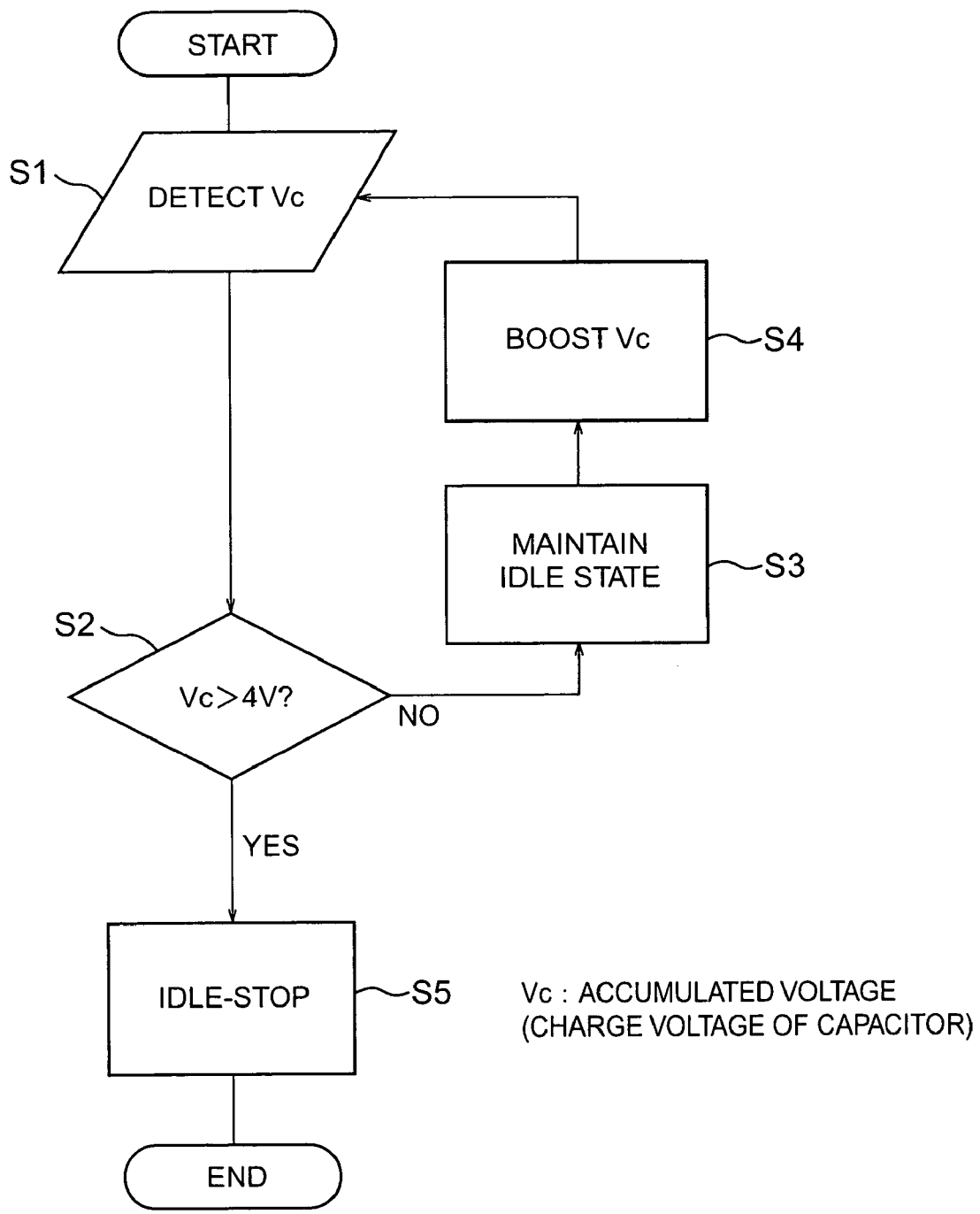
FIG. 5 is a flow chart showing a control method in the power circuit for a battery according to the present invention.

From FIG. 4, it is understood that when the idle-stop operation is continuously carried out nine times, the capacitor initial charging voltage at the ninth time becomes about 3.2 V, and hence it becomes impossible to obtain the predetermined motor output. In Embodiment 1 of the present invention, as shown in FIG. 5, system control using the engine 10, the electric motor 9, and the electric power conversion circuit 4 is carried out so that even when the idle-stop operation is continuously carried out, the predetermined motor output is obtained.

An operation will hereinafter be described with reference to FIG. 5. First of all, when the vehicle is stopped to stop the engine, a capacitor voltage Vc is detected (Step S1) to judge whether or not the capacitor voltage Vc is lower than 4 V (first threshold voltage) (Step S2). If it is judged in Step S2 that the capacitor voltage Vc is lower than 4 V, then the idle state is maintained (Step S3). Then, the DC/DC converter 3 is operated while maintaining the idle state as it is, and the capacitor voltage Vc is boosted to charge the capacitor group 2 with electricity so that the capacitor voltage Vc becomes equal to or higher than 4 V (Step S4). On the other hand, if it is judged in Step S2 that the capacitor voltage Vc is equal to or higher than 4 V, then the engine 10 is stopped (Step S5). When the engine 10 is started with the capacitor voltage Vc being insufficient (i.e., when the capacitor voltage Vc is lower than 4 V), since the engine 10 is in the idle state in Step S3, the engine 10 is started without the idle-stop in Step S5. This control method eliminates a fear of the electric motor 9 being unable to effect start-up due to insufficiency in the voltage. In addition, this also solves a problem of increased quantity of noxious exhaust materials due to the engine ignition at an engine rpm equal to or smaller than the predetermined engine rpm when the motor is started in a state of voltage insufficiency.

In addition, the voltage of the battery 1 is detected, and the first threshold (4 V in Embodiment 1) of the capacitor voltage is adjusted in accordance with the voltage of the battery 1, whereby the motor start-up after the idle-stop operation can be carried out with higher reliability. This control method will hereinafter be described.

Figure 6:
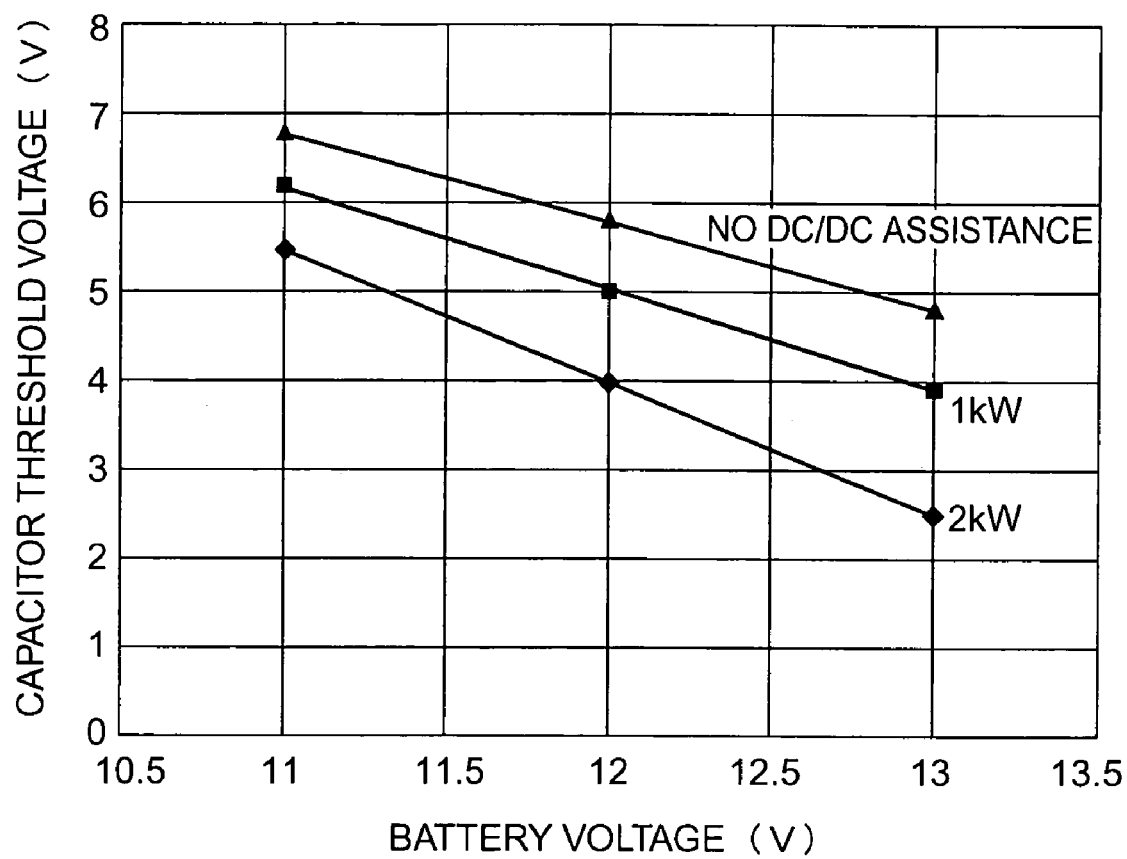
FIG. 6 is an explanatory diagram showing a relationship between a battery voltage and a threshold voltage of a capacitor with which the rpm of a motor can be increased to the desired rpm in the power circuit for a battery according to the present invention.

In the battery 1, the output voltage V in unloading is slightly changed according to the state of charge (SOC). In the case of the 12-V battery, this slight change is accompanied with a voltage fluctuation in the range of about ±1 to about ±2 V. If the voltage value of the 12 V-battery is fluctuated, then the maximum output electric power of the battery 1 is also fluctuated. Thus, there is a possibility that the desired electric power and voltage (4 kW/10 V or more in Embodiment 1) can not be supplied to the electric power conversion circuit 4, and insufficient motor start-up may result. FIG. 6 shows a relationship between the battery voltage and the threshold voltage of the capacitor group 2 at which the rpm of the motor can be increased up to the desired rpm. The threshold voltage of the capacitor group 2 when the battery voltage is 12 V is 4 V, whereas when the battery voltage decreases to 11 V, the threshold voltage of the capacitor group 2 increases to 5.5 V. Conversely, the threshold voltage when the battery voltage is 13 V decreases to 2.5 V. As described above, in Embodiment 1, when the SOC of the battery group 1 is high (the battery voltage is high), the first threshold voltage of the capacitor voltage is reduced, while when the SOC of the battery group 1 is low (the battery voltage is low), the first threshold of the capacitor voltage is increased, whereby the engine restart-up due to the idle-stop can be surely carried out.

Figure 7:
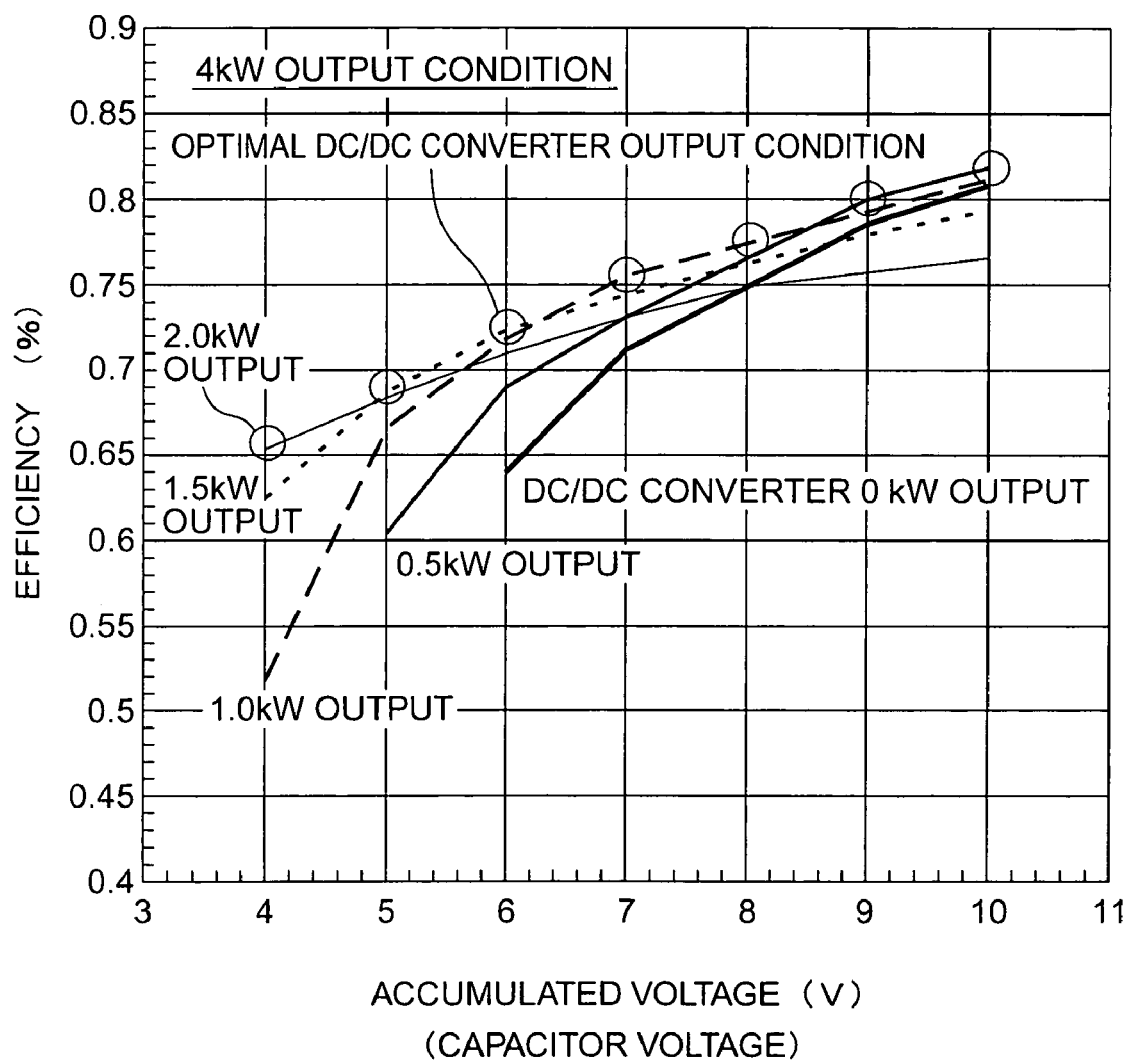
FIG. 7 is an explanatory diagram showing a relationship between a capacitor voltage for each output electric power of a DC/DC converter and a system efficiency when a battery, a capacitor group, and the DC/DC converter are regarded as one power circuit in the power circuit for a battery according to the present invention.

Next, another DC/DC converter control (maximum efficiency control) of Embodiment 1 of the present invention will hereinafter be described. FIG. 7 shows a relationship between the capacitor voltage (the accumulated voltage in the figure) for each output electric power of the DC/DC converter 3 obtained by solving Equations 1 to 6, and the system efficiency when the battery group 1, the capacitor group 2, and the DC/DC converter 3 are regarded as one power circuit. The output condition is 4 kW. As can be seen from the figure, the driving output condition of the DC/DC converter 3 under which the maximum efficiency of the system is obtained in each capacitor voltage condition varies, and also an optimal condition exists for each capacitor voltage. This is the reason why the capacitor voltage can not be made a fixed value.

An advantage of starting the engine 10 from the idle-stop state by the electric motor 9 under the condition permitting the maximum efficiency is that less calorification takes place in the system as a whole all the more because the same output can be obtained with higher efficiency. The power circuit is operated under the maximum efficiency condition, which results in that the calorification can be restrained to a minimum, in particular, the calorification of the capacitor group 2 is greatly suppressed. The calorification of the capacitor group 2 is suppressed to thereby solve the problem of reduced life due to rise in temperature of the capacitor group 2. Moreover, the calorification of the overall power circuit disposed in an engine room is suppressed to thereby suppress the problem of calorification of other apparatuses. From FIG. 7, it is understood that in a case where the accumulated voltage is 6 V for example, when the output of the DC/DC converter is 0 W, the instantaneous calorification is 2,260 W, whereas when the DC/DC converter 6 is operated at the electric power of 1.5 kW, a quantity of instantaneous calorification decreases to 1,530 W. In addition, it is understood that, at the point of the accumulated voltage of 10 V, when the DC/DC converter 6 is operated at 2 kW, the instantaneous calorification is 1,260 W, whereas when the DC/DC converter 6 is operated at 0.5 kW, the instantaneous calorification decreases to 880 W.

Figure 8:
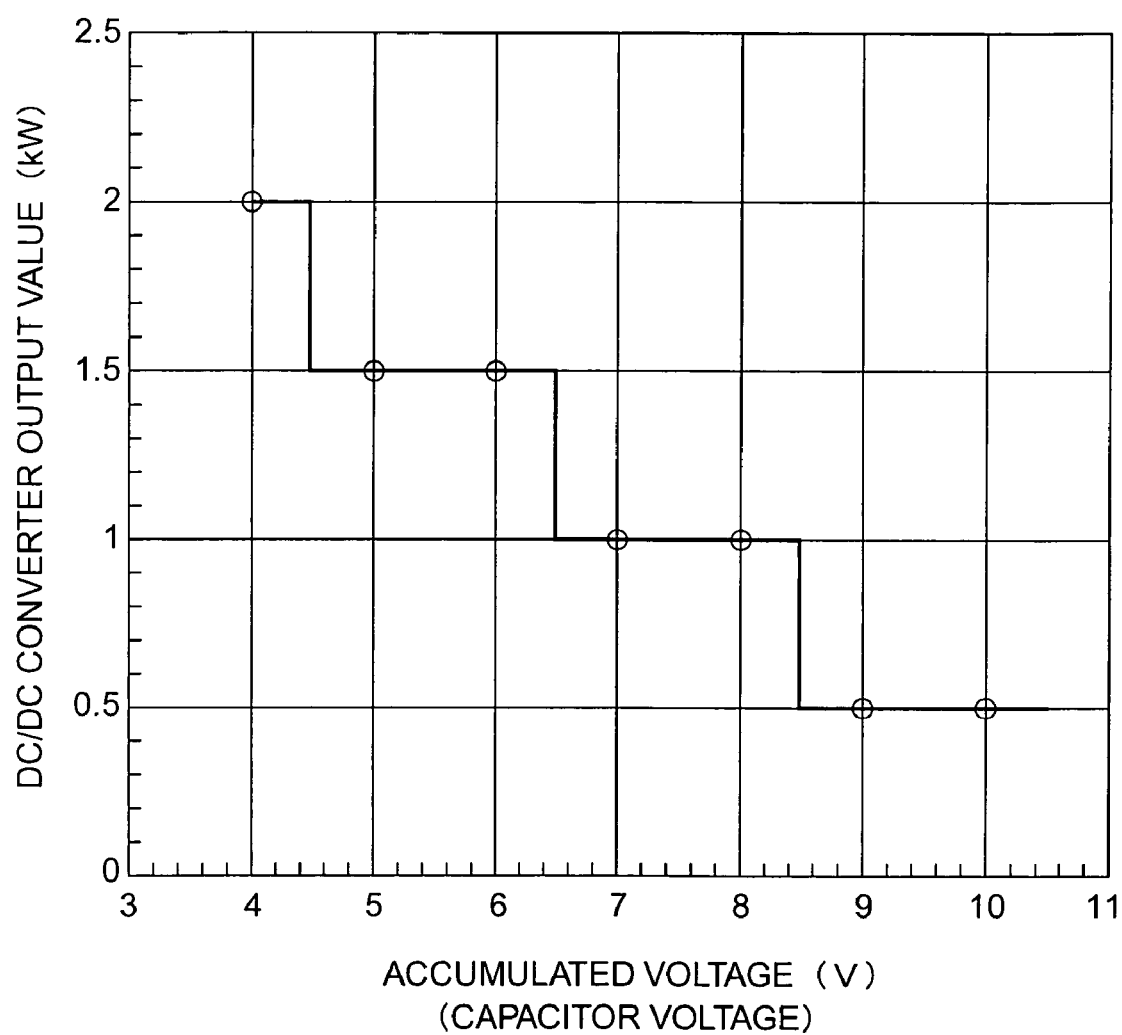
FIG. 8 is an explanatory diagram showing a relationship between a capacitor voltage and an output threshold voltage of a DC/DC converter in the power circuit for a battery according to the present invention.

Thus, in Embodiment 1 of the present invention, the capacitor voltage is detected, and the output electric power of the DC/DC converter 3 is controlled in accordance with the detected voltage value. FIG. 8 shows a relationship between the capacitor voltage (the accumulated voltage in the figure) and the output threshold voltage of the DC/DC converter 3 of Embodiment 1. The data in FIG. 8 is obtained from FIG. 7. In Embodiment 1 of the present invention, since, as shown in FIG. 8, the output electric power value of the DC/DC converter 3 can be adjusted in accordance with the value of the capacitor voltage, the power circuit can be operated so as to obtain the maximum efficiency.

In Embodiment 1, since the output electric power value of the DC/DC converter 3 is controlled, the current from the battery 1 to the DC/DC converter 2, and the voltage of the battery 1 are detected, an output target current value is set in the control circuit 8, and a duty ratio of a gate voltage signal of the MOSFET 32 as the switching element is adjusted on the basis of the comparison of the detected current value with the target current value.

While the description has been given with respect to the form in which the capacitor group is used as the second energy storage source, it is to be understood that even when the capacitor group is replaced with a battery, the same effects are obtained (in the case of the battery as well, the output voltage decreases if the discharge is repeatedly carried out).

Note that, in the above explanation, the effects of the present invention have been described under the above-mentioned certain condition. However, it is needless to mention that, not only in the above case, if the internal impedances of the battery and the capacitor, and the efficiency of the DC/DC converter change, then the capacitor threshold voltage (4 V) in the idle-stop condition and the output condition of the DC/DC converter corresponding to the capacitor voltage change accordingly.

In addition, while the description has been given with respect to the operation in the motor restart after the idle-stop operation (the electric power of 4 kW is outputted for a period of time of 0.3 sec), even when torque assistance after the motor restart (for about 1 sec) is carried out, the output of the DC/DC converter is controlled in accordance with the capacitor voltage which drops with time through the discharge of the capacitor energy to allow the same effects to be obtained. The torque assistance means that when a vehicle is operated using an engine, a motor is also operated simultaneously.

As described above, the power circuit for a battery according to Embodiment 1 includes a series-connected power supply having the battery 1 and the capacitor group 2 connected in series with each other, and the DC/DC converter 3 for shifting the electric power between the battery 1 and the capacitor group 2, and between the battery 1 and the electrical load. The voltage Vc of the capacitor group 2, as the energy storage source disposed on the high voltage side, of the series-connected power supply is detected, and when the detected voltage Vc is smaller than the predetermined value (the first threshold voltage, i.e., 4 V in this case), the capacitor group 2 is charged with electricity on the basis of the boosting operation of the DC/DC converter 3 so that the voltage of the capacitor group 2 becomes equal to or higher than the threshold voltage (first threshold voltage). As a result, the power circuit for a battery can always output the sufficient electric power.

In addition, the voltage of the capacitor group 2, as the energy storage source disposed on the high voltage side, of the series-connected power supply is detected, and when the detected voltage is smaller than the predetermined value (first threshold voltage), the rpm of the engine 10 is maintained at the idle rpm without carrying out the engine stop operation. As a result, it is possible to eliminate the problem of the electric motor 9 being unable to effect engine start-up.

In addition, the voltage of the capacitor group 2, as the energy storage source disposed on the high voltage side, of the series-connected power supply is detected, and when the detected voltage is smaller than the predetermined value (first threshold voltage), the running of the engine is maintained, and after the capacitor group 2 is charged with electricity on the basis of the boosting operation of the DC/DC converter 3 so that the capacitor voltage becomes equal to or higher than the threshold voltage (first threshold voltage), the engine 10 is stopped. As a result, even when the stop/start-up operation (idle-stop operation) is continuously carried out, sufficient electric power can be supplied to the electric motor 9 at start-up, and hence the engine rpm can be increased up to the predetermined rpm by the electric motor 9. Thus, it is possible to solve the problem of increased quantity of noxious exhaust materials due to the gasoline ignition in the low revolution range at start-up. In addition, it is possible to eliminate the problem of the electric motor 9 being unable to effect engine start-up.

Also, the voltage of the battery 1 as the first energy storage source, and the voltage of the capacitor group 2 as the second energy storage source are detected, and the threshold voltage (first threshold voltage) of the capacitor group 2 serving as a criterion for determining whether or not to restart the engine is adjusted in accordance with the voltage value of the battery 1 as the energy storage source disposed on the low voltage side. Thus, when the SOC of the battery 1 is high (the battery voltage is high), the threshold voltage of the capacitor is reduced, while when the SOC of the battery 1 is low (the battery voltage is low), the threshold voltage of the capacitor group 2 is increased. As a result, it is possible to surely carry out the engine restart-up based on the idle-stop.

Also, when the engine is started from the idle-stop state (motor stop state) by the motor, the voltage of the capacitor group 2, as the energy storage source disposed on the high voltage side, of the series-connected power supply is detected, and the output electric power of the DC/DC converter 3 is changed in accordance with the detected capacitor voltage. Thereby, it becomes possible to operate the overall power circuit system for a battery at a maximum efficiency, and a quantity of calorification of the overall system can be restrained to a minimum. In particular, the reduction in the life span of the capacitor group 2 due to rise in temperature caused by the calorification, and also an influence of the calorification exerted on other apparatuses can be suppressed.

EMBODIMENT 2

Figure 9:
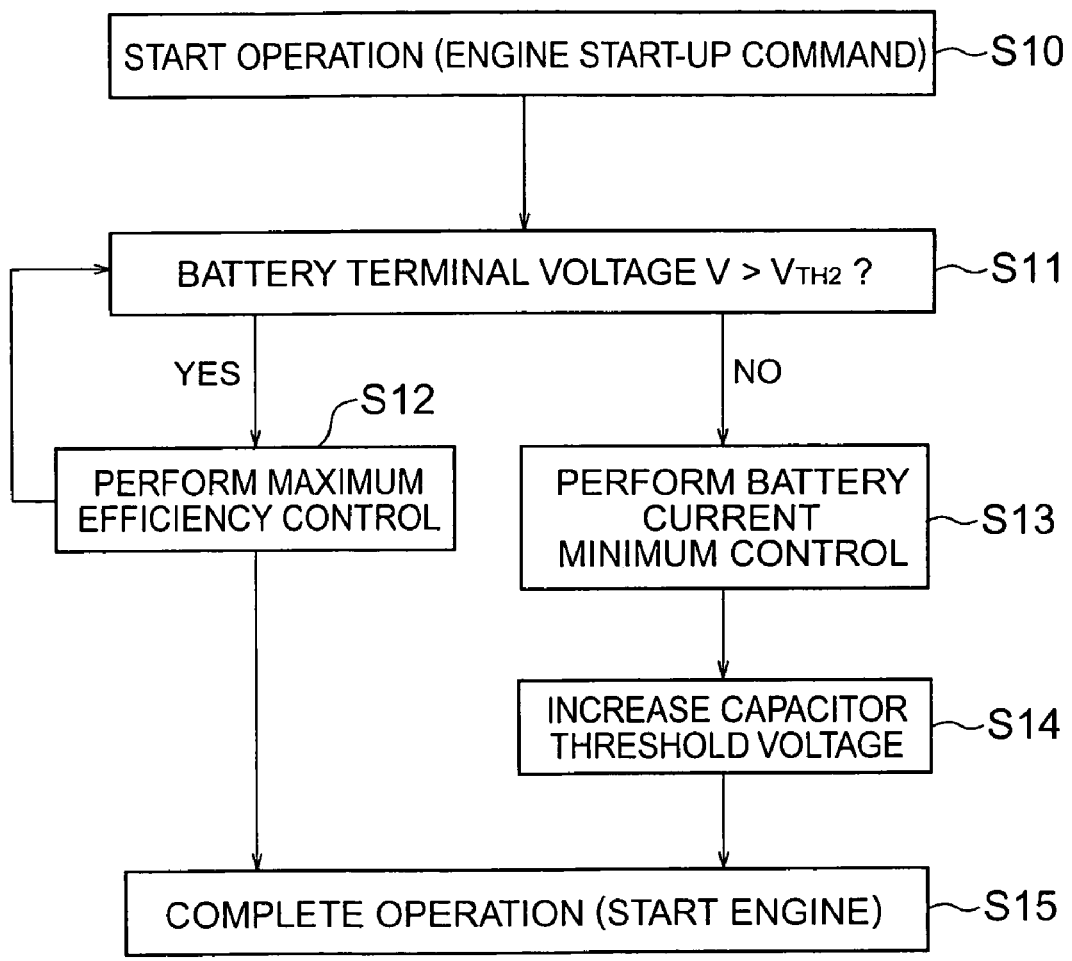
FIG. 9 is a flow chart showing an operation of a power circuit for a battery according to Embodiment 2 of the present invention.

FIG. 9 is a flow chart showing a flow of an operation of a power circuit for a battery according to Embodiment 2 of the present invention. Note that since a configuration of the power circuit for a battery according to Embodiment 2 of the present invention is the same as that of Embodiment 1 shown in FIG. 1, the reference should be made to FIG. 1 in this regard, and a detailed description is omitted here.

As shown in FIG. 9, in Embodiment 2, first of all, when an engine start-up command is issued in Step S10, in Step S11, it is judged whether or not the voltage across the terminals of the battery 1 is higher than a second threshold voltage $V_{TH2}$ (e.g., 8.0 V). If it is judged in Step S11 that the voltage across the terminals of the battery 1 is higher than the second threshold voltage $V_{TH2}$, then the operation proceeds to Step S12. The maximum efficiency control described in Embodiment 1 is carried out, and in Step S15, the engine is started. At this time, a judgment on the voltage across the terminals of the battery 1 in Step S1 is carried out at predetermined time intervals while carrying out the maximum efficiency control. On the other hand, if it is judged in Step S11 that the voltage across the terminals of the battery 1 is equal to or lower than the second threshold voltage $V_{TH2}$ (e.g., 8.0 V), then in Step S13, the control mode is changed over to the battery current minimum control. Then, in Step S14, the first threshold voltage V (its initial value in Embodiment 2 is 4 V) of the capacitor group 2, which serves as the condition for determining whether or not to stop the vehicle to stop the engine, is increased. Then, in Step S15, the engine is started.

Note that while in the above explanation, the description has been given with respect to the example in which the processing in Steps S13 and the processing in S14 are continuously executed, the present invention is not limited to this case. That is to say, the judgment on the condition for determining whether or not the processing in Step S14 is to be executed may be carried out before the processing in Step S14. That is, as the condition for increasing the capacitor threshold voltage, it may be set in advance that the processing in Step S14 is executed when the terminal voltage V of the battery 1 is higher than a third threshold voltage (e.g., 8.0 V).

Note that while described in Embodiment 1 as well and not illustrated in FIG. 1, the internal resistances exist in the battery 1 and the capacitor group 2, and hence if a large current is caused to flow through the battery 1 and the capacitor group 2, voltage drop or voltage rise occurs due to these internal resistances. An electrical load (illustration thereof is omitted; refer to Patent Document 1) such as an on-vehicle apparatus is connected to the battery 1, and hence there is a possibility that if the voltage across the terminals of the battery 1 abruptly decreases, this decrease may exert adverse influences on the electrical load. As for the electrical load connected to a 12 V-battery (its charge voltage is 14 V) which is generally used, there are many products for which the operation is ensured when the battery voltage is equal to or higher than 8 V. In addition, in the system using a 36 V-battery (its charge voltage is 42 V) which is anticipated to come into wide use in the future, a standard is being established which stipulates that the lowest voltage of a voltage across terminals of a battery be kept within the range of 21 to 25 V, and the highest voltage thereof be kept within the range of 51 to 55 V. Thus, when the electrical load is connected to the battery 1, it is necessary to limit the battery current so as to prevent the voltage across the terminals of the battery 1 from becoming equal to or smaller than a certain reference voltage value (about ⅔ of a nominal voltage value).

Since in Embodiment 2, the battery voltage changes in accordance with the output electric power of the DC/DC converter 3, it is necessary to obtain a relationship between the output electric power of the DC/DC converter 3 and the battery voltage. As for a path through which the electric power of the power circuit for a battery according to the present invention is outputted, there are a path through which the electric power is outputted from the battery 1 via the DC/DC converter 3 (hereinafter referred to as "output $P_1$" when applicable), and a path through which the electric power is outputted from the battery 1 via the capacity group 2 (hereinafter referred to as "output $P_2$" when applicable). A total electric power ($P_1+P_2$) of the outputs $P_1$ and $P_2$ becomes an electric power inputted to the electric power conversion circuit 4. When the electric motor 9 generates an electric power with which the battery 1 and the capacitor group 2 are in turn charged, the outputs $P_1$ and $P_2$ are negative values.

Next, the outputs $P_1$ and $P_2$, and an output voltage of the battery 1 at that time (an input voltage to the DC/DC converter) $V_{in}$ are calculated using the calculation model shown in FIG. 2. When a voltage across the terminals of the battery 1 in an unloading state is assigned V, a voltage across the terminals of the capacitor group 2 in an unloading state is assigned ΔV, the internal resistance of the battery 1 is assigned R, the internal resistance of the capacitor group 2 is assigned r, a current caused to flow through the battery 1 is assigned $I_B$, a current caused to flow through the capacitor group 2 is assigned $I_2$, an input current to the DC/DC converter 3 is assigned $I_1$, and an electric power conversion efficiency of the DC/DC converter 3 is assigned η, the outputs $P_1$ and $P_2$ are expressed as follows.

$$P_1 = (V_{in} + \Delta V - r \times I_2) \times I_2$$

$$P_2 = V_{in} \times I_1 \times \eta$$

$$V_{in} = V - R \times I_B$$

$$I_B = I_1 + I_2$$

From the equations described above, the current $I_B$ caused to flow through the battery 1 when the output electric power of the power circuit for a battery is P is expressed as follows.

$$I_B = \frac{(V + \Delta V) + \{(1-\eta)R + 2r\}I_1}{2(R+r)} - \frac{\sqrt{\{(V + \Delta V) - R(1+\eta)I_1\}^2 - 4(R+r)\{P + (R \cdot I_1^2 - V \cdot I_1)\eta\}}}{2(R+r)}$$

From the equation described above, it is understood that even if the output electric power P of the power circuit for a battery is fixed, the battery current depends on the input current $I_1$ to the DC/DC converter 3 and the voltage ΔV across the terminals of the capacitor group 2 in an unloading state.

Figure 10:
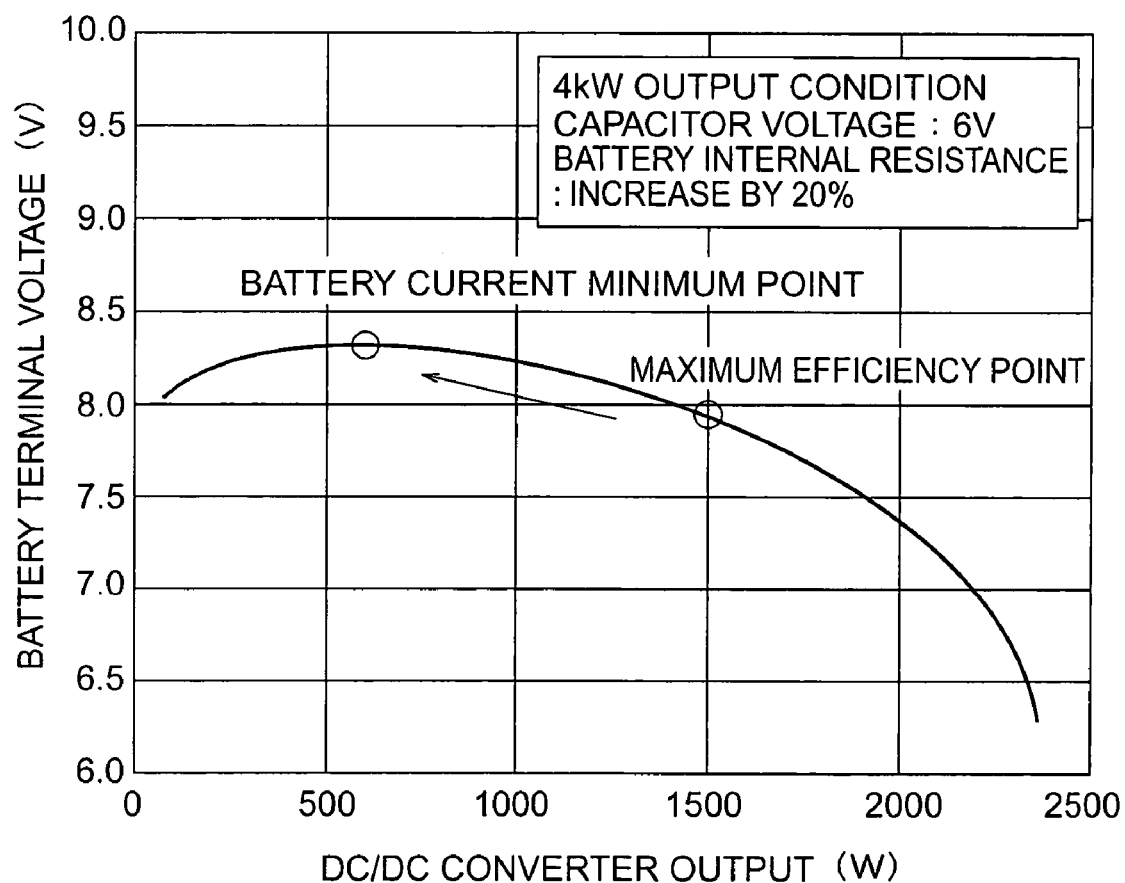
FIG. 10 is an explanatory diagram showing a relationship between a DC/DC converter output and a battery terminal voltage in the power circuit for a battery according to Embodiment 2 of the present invention.

As one example, there is shown in FIG. 10 a relationship between the output of the DC/DC converter 3 and the battery terminal voltage when the voltage V across the terminals of the battery 1 in an unloading state is 12 V, the voltage ΔV across the terminals of the capacitor group 2 in an unloading state is 6 V, the internal resistance R of the battery 1 is 9.6 mΩ (20% increase from 8 mΩ due to the degradation or the like), and the initial resistance r of the capacitor group 2 is 10.7 mΩ, and under this condition, the power circuit for a battery outputs the electric power of 4 kW. In the figure, there are shown the maximum efficiency running point described in Embodiment 1, and the battery current minimum point described in Embodiment 2.

From FIG. 10, it is understood that the DC/DC converter output and the battery voltage at the maximum efficiency running point are 1,500 W and 7.9 V, respectively, whereas at the battery current minimum point the battery voltage is 8.3 V and thus about 5% higher. As described above, it is understood that when the results of detection of the battery voltage show that the battery voltage becomes equal to or lower than the preset second threshold voltage (e.g., 8.0 V), the control mode is changed over from the maximum efficiency control to the battery current minimum control (Steps S11 and S13 in FIG. 9), whereby it becomes possible to suppress a decrease in output voltage of the battery.

In addition, when the control mode is changed over to the battery current minimum control, the first threshold voltage (its initial value in Embodiment 2 is 4 V) of the capacitor group 2 serving as the condition for determining whether or not to stop a vehicle to stop the engine 10 is increased (Step S14 in FIG. 9). The first threshold voltage of the capacitor group 2 is reset in accordance with the detected battery voltage. As a result, when a vehicle is stopped next time, the first threshold voltage of the capacitor group 2 serving as the engine stop condition becomes (4 V+α) (α>0). Thus, it is possible to prevent the output voltage of the battery 1 from decreasing.

Even when the internal resistances of the battery 1 and the capacitance group 2 are increased due to the degradation or the like of the battery 1 and the capacitor group 2 to deteriorate the battery performance and the capacitor performance, it is possible to suppress the decrease of the output voltage of the battery 1 at the time of outputting the predetermined electric power. Thus, the start-up operation of the engine 10 can be surely carried out without exerting adverse influences on other on-vehicle apparatuses connected to the battery 1.

Note that, in Embodiment 2, the same voltage value of 8.0 V serves as both the condition (second threshold voltage) for changing over the control mode from the maximum efficiency control to the battery current minimum control, and the condition (third threshold voltage) for increasing the capacitor threshold voltage. However, the present invention is not limited to this case. Thus, it is to be understood that the same effects can be obtained even when different values are set as the second and third threshold voltages.

As described above, similarly to Embodiment 1 described above, the power circuit for a battery according to Embodiment 2 includes the series-connected power supply having the battery 1 and the capacitor group 2 connected in series with each other, and the DC/DC converter 3 for shifting the electric power between the battery 1 and the capacitor group 2, and between the battery 1 and the electrical load. Thus, the voltage Vc of the capacitor group 2, as the energy storage source disposed on the high voltage side, of the series-connected power supply is detected, and when the detected voltage Vc is lower than the predetermined value (the first threshold voltage, i.e., 4 V in this case), the capacitor group 2 is charged with electricity on the basis of the boosting operation of the DC/DC converter 3 so that the voltage of the capacitor group 2 becomes equal to or higher than the threshold voltage (first threshold voltage). Hence, the power circuit for a battery canal ways output sufficient electric power.

In addition, similarly to Embodiment 1, the voltage of the capacitor group 2, as the energy storage source disposed on the high voltage side, of the series-connected power supply is detected, and when the detected voltage is smaller than the predetermined value (first threshold voltage), the rpm of the engine 10 is maintained at the idle rpm without carrying out the engine stop operation. Hence, it is possible to eliminate the problem of the electric motor 9 being unable to effect engine start-up.

In addition, similarly to Embodiment 1, the voltage of the capacitor group 2, as the energy storage source disposed on the high voltage side, of the series-connected power supply is detected, and when the detected voltage is smaller than the predetermined value (first threshold voltage), the engine rpm is maintained, and after the capacitor group 2 is charged with electricity on the basis of the boosting operation of the DC/DC converter 3 so that the capacitor voltage becomes equal to or higher than the threshold voltage (first threshold voltage), the engine is stopped. Thus, even when the stop/start-up operation (idle-stop operation) is continuously carried out, the electric power can be sufficiently supplied to the electric motor 9 at start-up, and hence the engine rpm can be increased to the predetermined rpm by the electric motor 9. As a result, it is possible to solve the problem of increased quantity of noxious exhaust materials due to the gasoline ignition in the low rpm range at start-up. In addition, it is possible to solve the problem of the electric motor 9 being unable to effect engine start-up.

Moreover, in Embodiment 2, the voltage value of the battery 1 as the first energy storage source is detected, and when, at the time of outputting large electric power, e.g., upon restarting the engine 10, the battery voltage becomes smaller than the preset reference voltage value (second threshold voltage), the DC/DC converter 3 is controlled so that the battery current becomes minimum. Thus, it is possible to suppress the voltage drop due to the internal resistance of the battery 1, and hence it is possible to eliminate adverse influences exerted on other on-vehicle apparatuses connected to the battery 1.

Also, when the results of detection of the voltage value of the battery 1 as the first energy storage source show that the battery voltage becomes smaller than the preset reference voltage value (third threshold voltage), the first threshold voltage is increased and this is reflected on the idle-stop condition from the next time onward. Thus, it is possible to suppress reduction of the battery voltage at start-up of the motor, and hence it is possible to eliminate adverse influences exerted on other on-vehicle apparatuses connected to the battery 1.

EMBODIMENT 3

Figure 11:
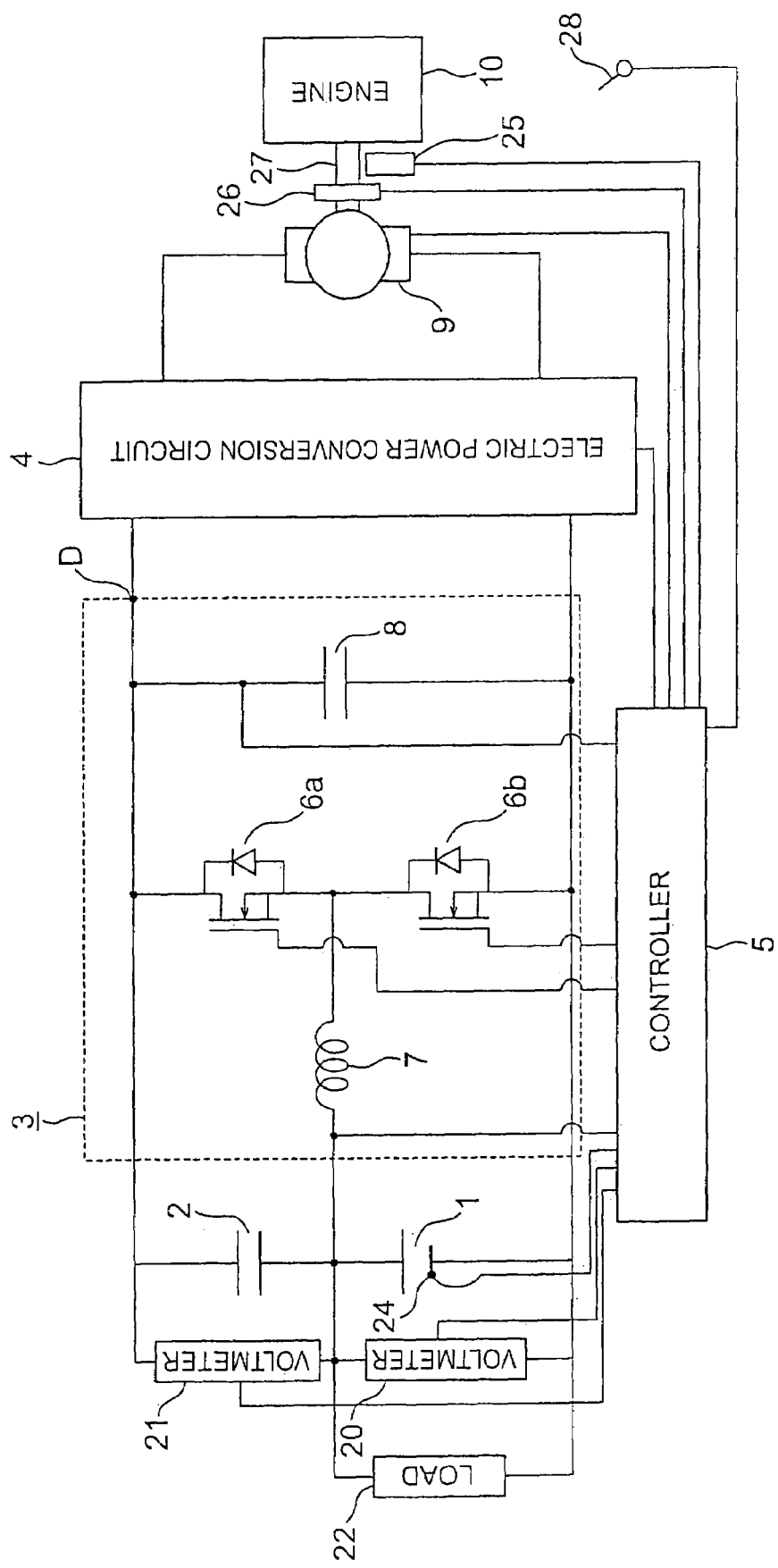
FIG. 11 is a circuit diagram showing a configuration of a power circuit for a battery according to Embodiment 3 of the present invention.
Figure 12:
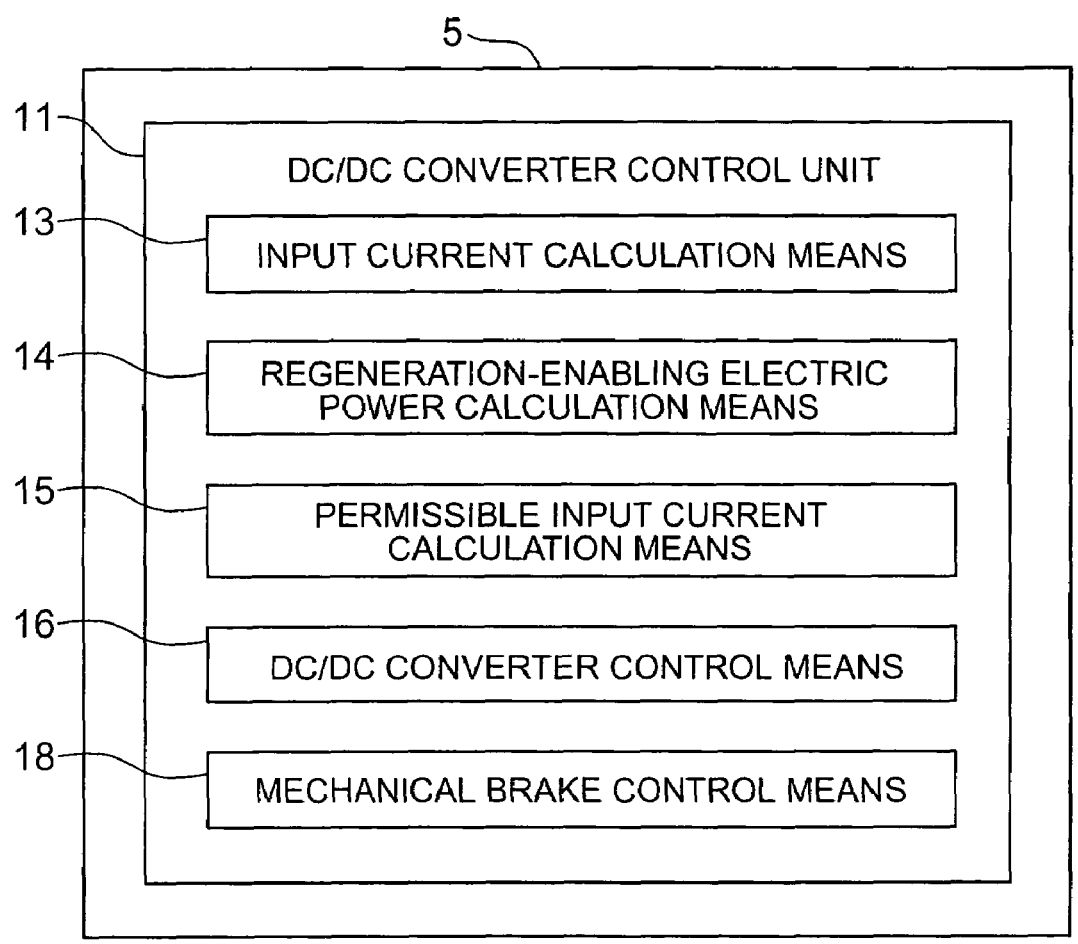
FIG. 12 is a detailed block diagram of a control circuit shown in FIG. 11.
Figure 13:
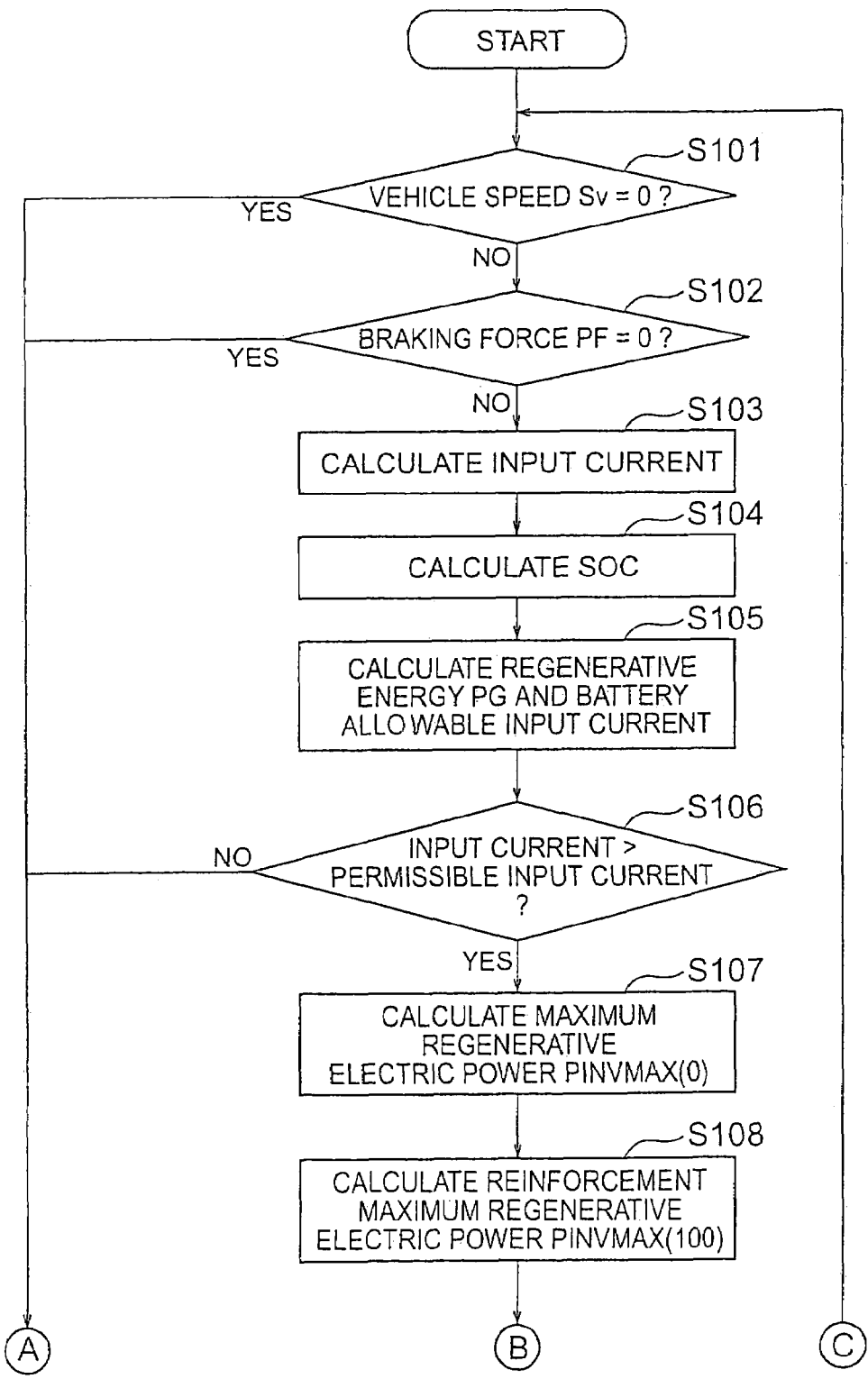
FIG. 13 is a flow chart of regenerative control shown in FIG. 11.
Figure 14:
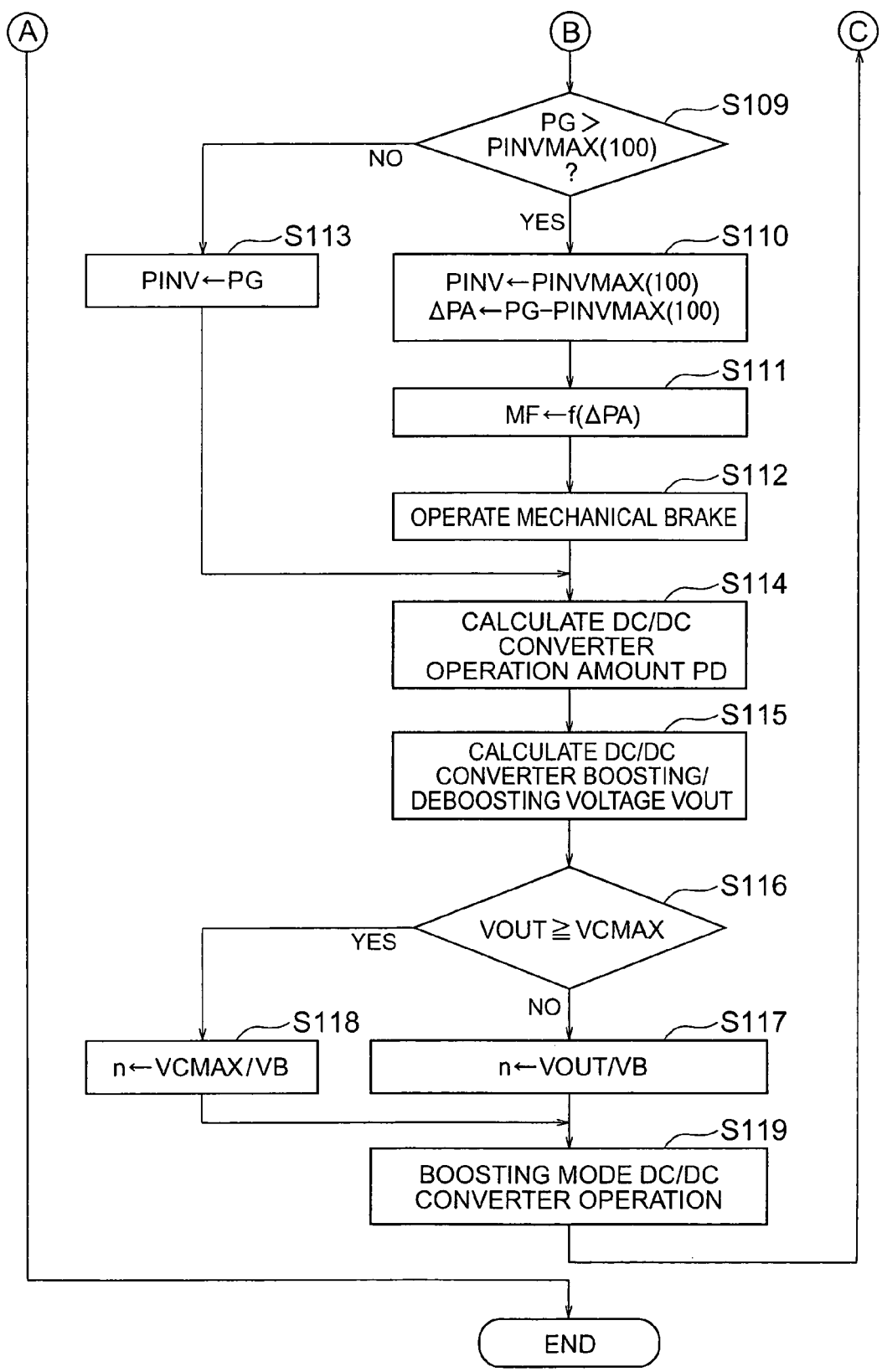
FIG. 14 is a flow chart of regenerative control shown in FIG. 11.
Figure 15:
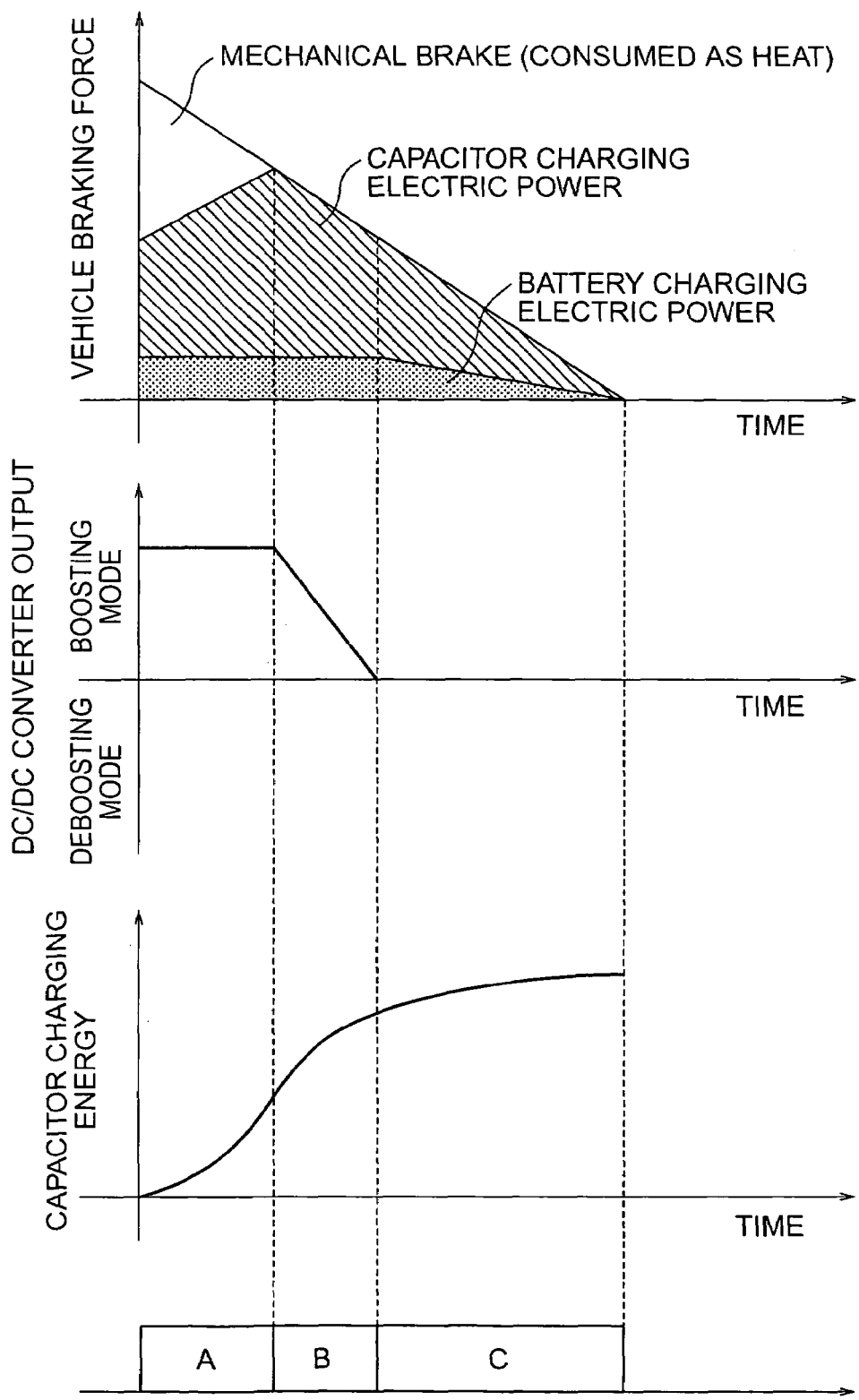
FIG. 15 is a diagram showing how charging is carried out in the power circuit for a battery of FIG. 11.

FIG. 11 is a circuit diagram showing a configuration of a power circuit for a battery according to Embodiment 3 of the present invention. FIG. 12 is a detailed block diagram of a controller shown in FIG. 11. FIGS. 13 and 14 are a flow chart of regenerative control in FIG. 11. FIG. 15 is a diagram showing how charging is carried out in a power circuit for a battery shown in FIG. 11.

As shown in FIG. 11, the power circuit for a battery includes: a battery 1 as a first energy storage source; a capacitor 2 which is connected in series with the battery 1 and which serves as a second energy storage source having an allowable input current larger than that of the battery 1; a DC/DC converter 3 inserted between the battery 1 and the capacitor 2; an electric power conversion circuit 4 connected between terminals of a series-connected body of the battery 1 and the capacitor 2; and a controller 5 for controlling the DC/DC converter 3 and the electric power conversion circuit 4.

The battery 1 is a plumbic acid battery having a rated voltage of 12 V and an equivalent series resistance of 8 m$\Omega$. The battery 1 has the characteristic of the allowable input electric power =PBMAX(W). Since the battery 1 is degraded if rapidly charged with a large electric power, an allowable input electric power PBMAX corresponding to a battery temperature and a state of charge (SOC) is set in the battery 1. Since the voltage of the battery 1 does not largely change, an allowable input current IBMAX is set therefor instead of the allowable input electric power PBMAX. The allowable input electric power PBMAX of the plumbic acid battery is about 100 W/kg.

The capacitor 2 is an electrical double layer capacitor, an aluminum electrolytic capacitor, or the like having a large electric capacity. An allowable input electric power PCMAX (W) of the capacitor 2 is larger than that of the plumbic acid battery, and is about 1,000 W/kg. In Embodiment 3, used as the capacitor 2 is a capacitor block in which the electrical double layer capacitors each having an allowable applied voltage (VCMAX) of 2.5 V, an equivalent series resistance (r) of 8 m$\Omega$, and an electrostatic capacity (C) of 100 F are connected, with three capacitors in parallel and fifteen capacitors in series. An allowable applied voltage of the capacitor 2 is 37.5 V.

The DC/DC converter 3 includes an upper arm switching element 6a as an upper arm switch, a lower arm switching element 6b as a lower arm switch, a choke coil inductor 7, and a smoothing capacitor 8. The DC/DC converter 3 constitutes a bidirectional boosting/deboosting D.C. chopper circuit, and the electric power is shifted between the battery 1 and the capacitor 2 through the DC/DC converter 3. Each of the switching elements 6a and 6b is constituted by a MOSFET.

The DC/DC converter 3 is controlled in a manner as will be described below to carry out the electric power conversion. In the following description, the electric power shift from the battery 1 towards the capacitor 2 (hereinafter referred to as a boosting mode DC/DC converter operation) is given as an example.

The upper arm switching element 6a is turned OFF and the lower arm switching element 6b is turned ON to cause a current to flow from the battery 1 to the choke coil inductor 7. Next, the lower arm switching element 6b is turned OFF and at the same time, the upper arm switching element 6a is turned ON to apply the current caused to flow through the choke coil inductor 7 across the terminals of the capacitor 2 through the upper arm switching element 6a. The electric power of the battery 1 is supplied to the capacitor 2 by repeatedly carrying out this operation. The output current of the DC/DC converter 3 can be changed by changing an ON-time ratio between the upper arm switching element 6a and the lower arm switching element 6b.

The electric power shift from the capacitor 2 towards the battery 1 (hereinafter referred to as a deboosting mode DC/DC converter operation) can be carried out by performing the operation reverse to that in the above description.

The MOSFET as the switching element receives as its input a signal to turn ON/OFF its gate to thereby carry out the switching operation.

The electric power conversion circuit 4 carries out the electric power shift between the series-connected body of the battery 1 and the capacitor 2, and an electric motor 9. The electric motor 9 is connected to an axle 27 coupled to an engine 10. At start-up, the D.C. electric power from the battery 1 and the capacitor 2 is converted into an A.C. electric power by the electric power conversion circuit 4 to rotate the axle 27 with the electric motor 9 as a motor. For braking, an A.C. electric power generated from the electric motor 9 serving as a power generator is converted into a D.C. electric power by the electric power conversion circuit 4 to charge the battery 1 and the capacitor 2 with electricity. The A.C. electric power acts as a braking force against the rotation of the axle 27. The axle 27 is provided with a brake mechanism 26 for applying the brake on the rotation of the axle 27. The brake mechanism 26 is provided with a mechanical brake (not shown) for mechanically applying the brake on the rotation of the axle 27 in accordance with a command issued from the controller 5.

There is further provided a brake pedal 28, as a braking command unit, for issuing a brake command in accordance with which the speed of the vehicle is decelerated. The brake command is inputted in the form of a braking force PF to the controller.

The controller 5, as shown in FIG. 12, has a DC/DC converter control unit 11. The DC/DC converter control unit 11 includes input current calculation means 13, regeneration-enabling electric power calculation means 14, allowable input current calculation means 15, DC/DC converter control means 16, and mechanical brake control means 18. The controller 5 is constituted by a microcomputer having a CPU, a RAM, a ROM and an interface circuit.

The power circuit for a battery, as shown in FIG. 11, further includes a battery voltmeter 20 as a first voltmeter for measuring a voltage VB developed across the terminals of the battery 1, a capacitor voltmeter 21 as a second voltmeter for measuring a voltage VC developed across the terminals of the capacitor 2, a thermometer 24 for measuring a temperature TB of the battery 1, and a vehicle speed sensor 25 for measuring a vehicle speed Sv.

An electrical load 22 such as an on-vehicle apparatus is connected to the battery 1.

Next, a description will hereinafter be given with respect to a configuration of the controller 5 of the power circuit for a battery shown in FIG. 12.

The input current calculation means 13 calculates a regenerative energy PG(W) on the basis of the vehicle speed Sv(km/hr) from the vehicle speed sensor 25, and a braking force PF(N) from the brake pedal 28. The regenerative energy PG is a value which is obtained by converting a braking energy required to apply the brake on a vehicle traveling at the vehicle speed Sv with the predetermined braking force PF into a quantity of electricity. Moreover, the input current calculation means 13 obtains an input current I(A) on the basis of the voltage VB developed across the terminals of the battery 1, the voltage VC developed across the terminals of the capacitor 2, and the regenerative energy PG.

On the other hand, the regeneration-enabling electric power calculation means 14 calculates the SOC(%) of the battery 1 on the basis of the voltage VB developed across the terminals of the battery 1. The battery SOC is a value corresponding to the terminal voltage VB of the battery 1. This value is stored as table data in the regeneration-enabling electric power calculation means 14.

Moreover, the regeneration-enabling electric power calculation means 14 calculates the battery allowable input electric power PBMAX(W) from the battery SOC. When the battery temperature TB is high, the battery allowable input electric power PBMAX becomes less, and when the battery SOC is large, the battery allowable input electric power PBMAX also becomes less.

Moreover, the regeneration-enabling electric power calculation means 14 calculates the maximum regenerative electric power PINVMAX(0)(W) from the battery allowable input electric power PBMAX.

Furthermore, the regeneration-enabling electric power calculation means 14 calculates the maximum regenerative electric power PINVMAX(100)(W) when the DC/DC converter 3 is operated at maximum to carry out the electric power conversion on the basis of the battery allowable input electric power PBMAX and a preset DC/DC converter maximum output PDMAX(W).

The allowable input current calculation means 15 obtains an allowable input current IBMAX(A) of the battery 1 on the basis of the battery allowable input electric power PBMAX and the terminal voltage VB of the battery 1.

The DC/DC converter control means 16, when the regenerative energy PG is larger than the maximum regenerative electric power PINMAX(0), calculates a DC/DC converter operation quantity PD on the basis of the regenerative electric power PINVMAX(0), the battery voltage VB, the capacitor voltage VC and the battery maximum current IBMAX.

Moreover, the DC/DC converter control means 16 obtains a ratio n between a boosted quantity and a deboosted quantity from the DC/DC converter operation quantity PD. In this connection, when the current of the battery 1 is assigned IB*, the electric power PD(W) which is shifted from the battery 1 to the capacitor 2 through the DC/DC converter 3 is expressed as PD=VD×(IC−IB). The DC/DC converter control means 16 obtains VD=PD/(IC−IB) to obtain a ratio n=VD/VB between a boosted quantity and a deboosted quantity.

Furthermore, the DC/DC converter control means 16 obtains a period of turn-ON/OFF of the switching means so as to obtain the ratio n between a boosted quantity and a deboosted quantity, and under this condition, operates the DC/DC converter.

As described above, in this case, the DC/DC converter control means 16 shifts the electric power from the battery 1 to the capacitor 2.

The DC/DC converter control means 16, when the regenerative energy PG is equal to or less than the maximum regenerative electric power PINVMAX(0), calculates the DC/DC converter operation quantity PD on the basis of the regenerative electric power PINVMAX(0), the battery voltage VB, the capacitor voltage VC and the battery maximum current IBMAX.

In this case, the DC/DC converter control means 16 shifts the electric power from the capacitor 2 to the battery 1.

The mechanical brake control means 18 compares the regenerative energy PG with the maximum regenerative electric power PINVMAX(100) If it is judged that the regenerative energy PG is larger than the maximum regenerative electric power PINVMAX(100), then the mechanical brake control means 18 obtains a difference ΔPA between the regenerative energy PG and the maximum regenerative electric power PINVMAX(100) to convert the difference ΔPA into a mechanical brake operation quantity MF.

Moreover, the mechanical brake control means 18 operates the mechanical brake on the basis of the mechanical brake operation quantity MF to apply the brake on the vehicle.

Next, referring to FIGS. 13 and 14, a description will hereinafter be given with respect to a procedure of regeneration control of the power circuit for a battery.

In Step (hereinafter abbreviated as S when applicable) 101, the input current calculation means 13 acquires data of the vehicle speed Sv (km/hr) from the vehicle speed sensor 25 to judge whether or not the vehicle speed Sv is zero. The regeneration control is completed when the vehicle speed is zero, because the vehicle is in a stop state. On the other hand, when the vehicle speed is not zero, the operation proceeds to S102.

In S102, the input current calculation means 13 acquires data of the braking force PF(N) from the brake pedal 28 to judge whether or not the braking command is issued. When the braking force is zero, no regenerative energy is generated because no braking is tried to be applied. Thus, the regeneration control is completed. If it is judged in S102 that the braking command is issued, then the operation proceeds to S103.

In S103, the input current calculation means 13 calculates the regenerative energy PG(W) on the basis of the vehicle speed Sv and the braking force PF. Then, the input current calculation means 13 obtains the input current I(A) on the basis of the regenerative energy PG, the terminal voltage VB(V) of the battery, and the terminal voltage VC(V) of the capacitor.

In S104, the allowable input current calculation means 15 calculates the SOC(%) of the battery from the terminal voltage VB(V) of the battery.

In S105, the allowable input current calculation means 15 calculates the battery allowable input electric power PBMAX(W) from the battery temperature TB(° C.) and the SOC of the battery. Also, the allowable input current calculation means 15 calculates the battery allowable input current IBMAX(A) from the battery allowable input electric power PBMAX and the battery terminal voltage VB.

In S106, the regeneration-enabling electric power calculation means 14 compares the input current I with the battery allowable input current IBMAX. If it is judged in S106 that the input current I is larger than the battery allowable input current IBMAX, then the operation proceeds to S107. On the other hand, if it is judged in S106 that the input current I is equal to or smaller than the battery allowable input current IBMAX, the regeneration control is completed.

In S107, the regeneration-enabling electric power calculation means 14 obtains the capacitor input electric power PC(IBMAX) from the battery allowable input current IBMAX and the terminal voltage Vc of the capacitor. Also, the regeneration-enabling electric power calculation means 14 calculates the maximum regenerative electric power PINVMAX(0) when no DC/DC converter is driven from the battery allowable input electric power PBMAX and the capacitor input electric power PC(IBMAX).

In S108, the regeneration-enabling electric power calculation means 14 obtains a reinforcement maximum regenerative electric power PINVMAX(100) from Equation 1 on the basis of the battery allowable input electric power PBMAX, the preset maximum driving electric power PDMAX of the DC/DC converter, and the battery terminal voltage VB.

$$P_{INVMAX}(100) = \frac{V_B + V_C}{V_B} P_{BMAX} + \frac{V_C}{V_B} P_{DMAX}$$

In S109, the DC/DC converter control means 16 compares the regenerative energy PG with the reinforcement maximum regenerative electric power PINVMAX(100). If it is judged in S109 that the regenerative energy PG is larger than the reinforcement maximum regenerative electric power PINVMAX(100), then the operation proceeds to S110. On the other hand, if it is judged in S109 that the regenerative energy PG is equal to or smaller than the reinforcement maximum regenerative electric power PINVMAX(100), then the operation proceeds to S113.

In S110, the DC/DC converter control means 16 sets the reinforcement maximum regenerative electric power PINVMAX(100) as the regenerative operation quantity PINV. At the same time, the mechanical brake control means 18 obtains a difference ΔPA between the regenerative energy PG and the reinforcement maximum regenerative electric power PINVMAX(100).

In S111, the mechanical brake control means 18 obtains a mechanical brake operation quantity MF from the difference ΔPA.

In S112, the mechanical brake control means 18 operates the brake mechanism 26 on the basis of the mechanical brake operation quantity MF to apply the braking force to the vehicle. Then, the operation proceeds to S114.

In S113, the DC/DC converter control means 16 sets the regenerative energy PG as the regenerative operation quantity PINV. Then, the operation proceeds to S114.

In S114, the DC/DC converter control means 16 obtains a DC/DC converter conversion electric power PD from Equation 2 on the basis of the regenerative operation quantity PINV, the battery allowable input electric power IBMAX, the battery terminal voltage VB, and the terminal voltage VC of the capacitor.

$$P_D = \frac{V_B}{V_C} \{P_{INV} - (V_B + V_C) I_{BMAX}\}$$

In S115, the DC/DC converter control means 16 obtains a DC/DC converter output voltage VOUT from the DC/DC converter conversion electric power PD.

In S116, the DC/DC converter control means 16 compares the DC/DC converter output voltage VOUT with the capacitor allowable applied voltage VCMAX. If it is judged in S116 that the DC/DC converter output voltage is lower than the capacitor allowable applied voltage VCMAX, then the operation proceeds to S117. On the other hand, if it is judged in S116 that the DC/DC converter output voltage VOUT is equal to or higher than the capacitor allowable applied voltage VCMAX, then the operation proceeds to S118.

In S117, the DC/DC converter control means 16 obtains the ratio n between the boosted quantity and the deboosted quantity from the converter output voltage VOUT and the battery voltage.

In S118, the DC/DC converter control means 16 obtains the ratio n between the boosted quantity and the deboosted quantity from the capacitor allowable applied voltage VCMAX and the battery voltage VB.

In S119, the DC/DC converter control means 16 drives the DC/DC converter to shift the electric power from the battery to the capacity to charge the capacity with electricity (the electric power conversion by the DC/DC converter in this direction is referred to as a boosting mode DC/DC converter operation when applicable). Then, the operation is returned back to S101.

Next, referring to FIG. 15, a description will hereinafter be given with respect to how charging is carried out while the brake is applied to the vehicle. A vehicle braking force shown in FIG. 15, for example, is generated when the vehicle is decelerated at about a fixed acceleration from a certain speed.

In a section A, as described above, the DC/DC converter is operated in a boosting mode at a maximum output to thereby increase the reinforcement regenerative electric power. Thus, the regenerative electric power increases as the voltage of the capacitor increases. At this time, the electric power which cannot be regenerated by the power circuit for a battery is consumed by the mechanical brake.

In a section B, when the reinforcement regenerative electric power becomes larger than the regenerative energy consumed by the vehicle braking, no mechanical brake is operated. Thus, the overall vehicle braking force is converted into the electric power for generation in the electric motor, which makes it possible to regenerate all the kinetic energies. At this time, the output of the DC/DC converter is controlled so that the charging electric power for the battery becomes the allowable input electric power PBMAX.

In a section C, the output of the DC/DC converter becomes zero. The charging electric power for the battery and the capacitor charges in accordance with a ratio in voltage between the battery and the capacitor.

Figure 16:
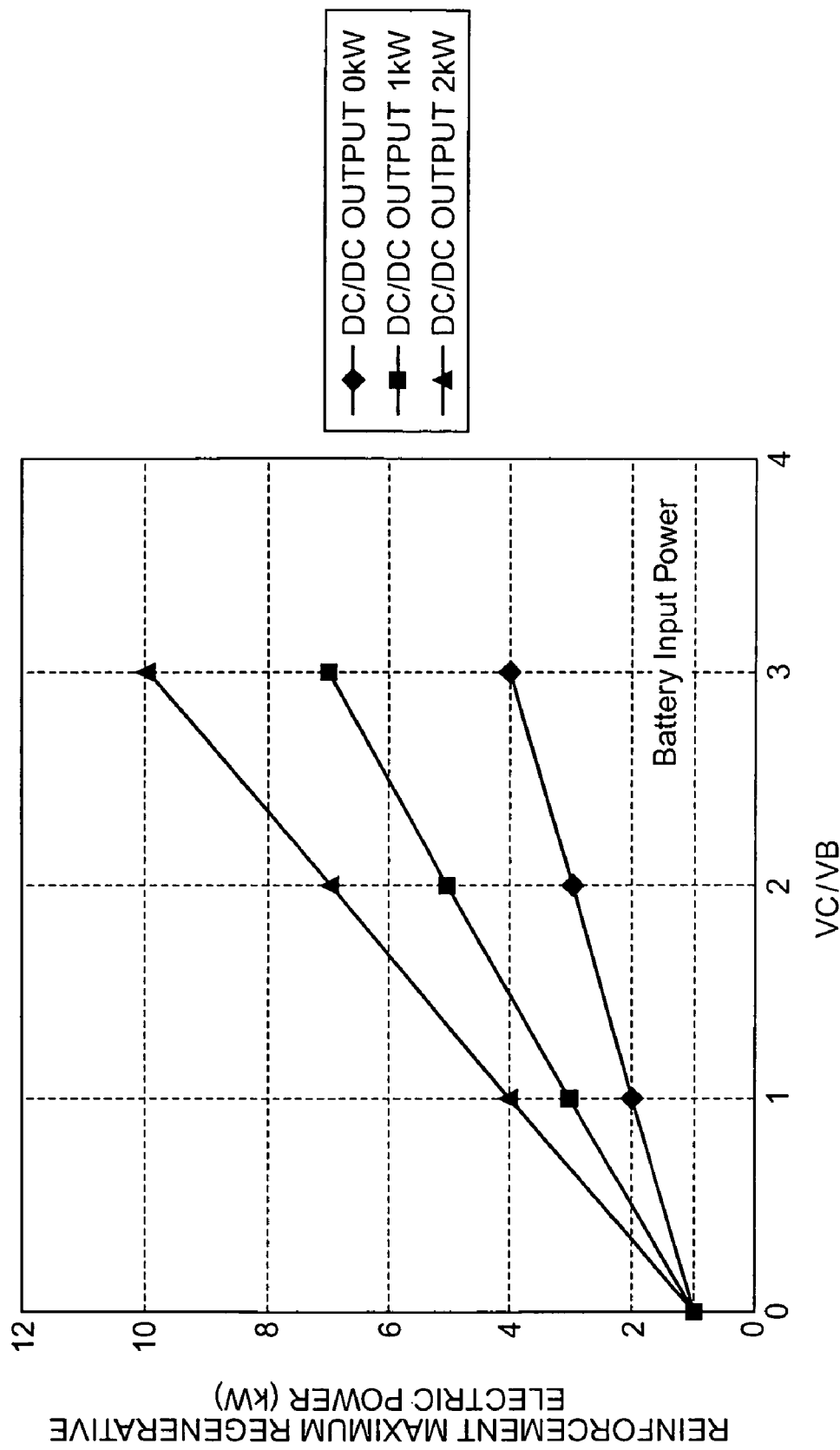
FIG. 16 is a diagram showing a relationship between a capacitor voltage and a maximum regenerative electric power of the power circuit for a battery when an allowable input electric power of the battery is set to 1 kW.

A description will hereinafter be given with respect to such an increase in the regenerative electric power using the power circuit for a battery with reference to FIG. 16. FIG. 16 shows a relationship between the capacitor voltage VC and the maximum regenerative electric power PINV of the power circuit for a battery when the allowable input electric power PBMAX of the battery 1 is set to 1 kW.

For example, the regenerative electric power when the DC/DC converter 3 is operated at 1 kW is, when the capacitor voltage Vc is equal to the battery voltage VB, 1.5 times as large as that when no DC/DC converter 3 is operated, and is, when the capacitor voltage Vc is 3 times as large as the battery voltage VB, 1.75 times as large as that when no DC/DC converter 3 is operated.

In addition, the regenerative electric power when the DC/DC converter 3 is operated at 2 kW is, when the capacitor voltage VC is equal to the battery voltage VB, twice as large as that when no DC/DC converter 3 is operated, and is, when the capacitor voltage Vc is 3 times as large as the battery voltage VB, 2.5 times as large as that when no DC/DC converter 3 is operated.

As described above, the regenerative electric power of the power circuit for a battery further increases as the output of the DC/DC converter 3 further increases. As a result, the electric power is shifted from the battery to the capacitor through the DC/DC converter 3 during regeneration of the energy to thereby increase the regenerative electric power of the power circuit for a battery.

Figure 17:
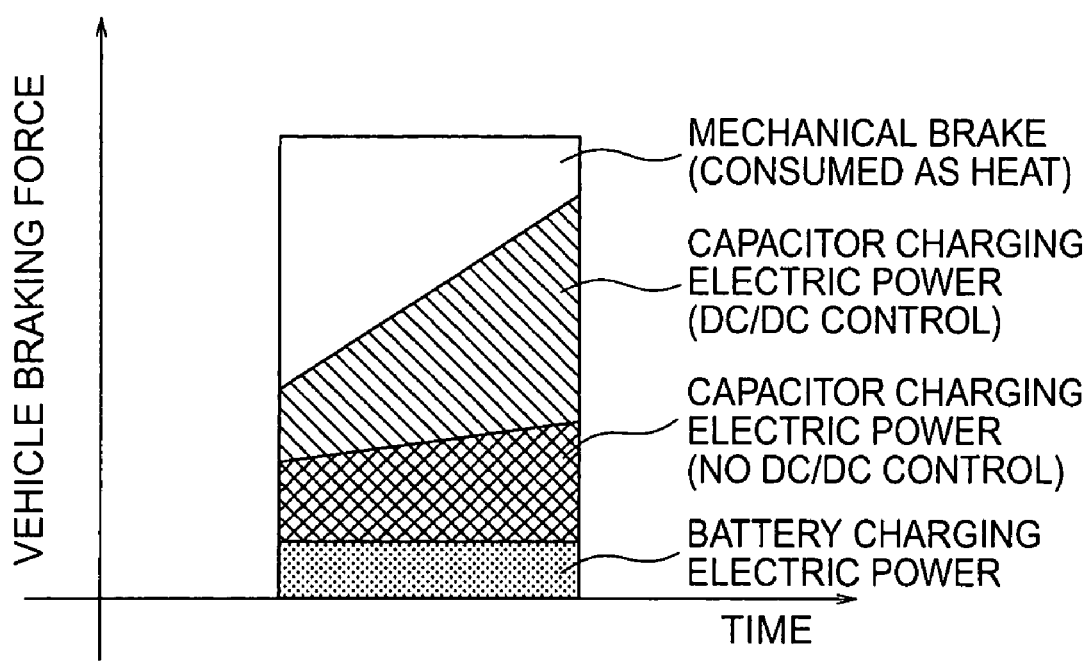
FIG. 17 is a diagram showing a regenerative electric power regenerated in the power circuit for a battery when a large vehicle braking force is required to be produced in a relatively short period of time.

FIG. 17 shows the regenerative electric power regenerated in the power circuit for a battery when a large vehicle braking force is required for a relatively short period of time. The charge current of the capacitor when no DC/DC converter 3 is operated is determined on the basis of the allowable charge current of the battery. Thus, since the charge electric power for the capacitor can not increase, a quantity of energy able to be regenerated in the power circuit for a battery does not become so large. On the other hand, if the electric power is shifted from the battery 1 to the capacitor 2 through the DC/DC converter 3, then the charge electric power for the capacitor 2 increases. Hence, it becomes possible to increase the regenerative electric power for the power circuit for a battery. The reason that the charge electric power of the capacitor 2 increases with time is that since the charging of the capacitor 2 increases the voltage, the allowable input power to the capacitor increases accordingly.

In the power circuit for a battery of the present invention, since during the braking of the automobile, the electric power is shifted from the battery to the capacitor having input electric power density larger than that of the battery through the DC/DC converter, it is possible to increase the charge electric power for the battery and the capacitor.

In addition, since the battery is charged with an electric power equal to or less than the allowable input electric power of the battery, it is possible to prevent the charging in an over-power state of the battery, and it is also possible to lengthen the life of the battery.

Moreover, since the capacitor is charged with the voltage equal to or lower than the allowable applied voltage of the capacitor, it is possible to prevent the degradation of the capacitor due to an over-voltage and it is also possible to lengthen the life of the capacitor.

The power circuit for a battery controls the electric power generated by the electric motor so that the generated electric power becomes equal to or less than the electric power obtained by adding the allowable input electric power of the first energy storage source and the allowable input electric power of the second energy storage source. Hence, the braking energy during deceleration of the vehicle can be regenerated with high efficiency, and thus the rate of fuel consumption of the vehicle can be improved.

At that, with respect to the configuration of the DC/DC converter 3, there are conceivable various configurations in addition to the configuration shown in FIG. 11. However, any configuration may be adopted as long as the electric power is basically shifted between the battery 1 and the capacitor 2 with the configuration concerned. In addition, the MOSFETs are used as the switching elements of the DC/DC converter 3. However, a semiconductor device such as an IGBT or a bipolar transistor may also be used.

Note that while in Embodiment 3, the electrical double layer capacitors are used as the second energy storage source, even when an aluminum electrolytic capacitor is used, the same effects can be obtained.

In addition, when the plumbic acid battery is used as the first energy storage source, even if the battery having a large allowable input electric power is used as the second energy storage source, similarly, the regenerative electric power can be increased. For example, a nickel-cadmium battery, a nickel-hydrogen battery, or a lithium ion battery may be used.

EMBODIMENT 4

Figure 18:
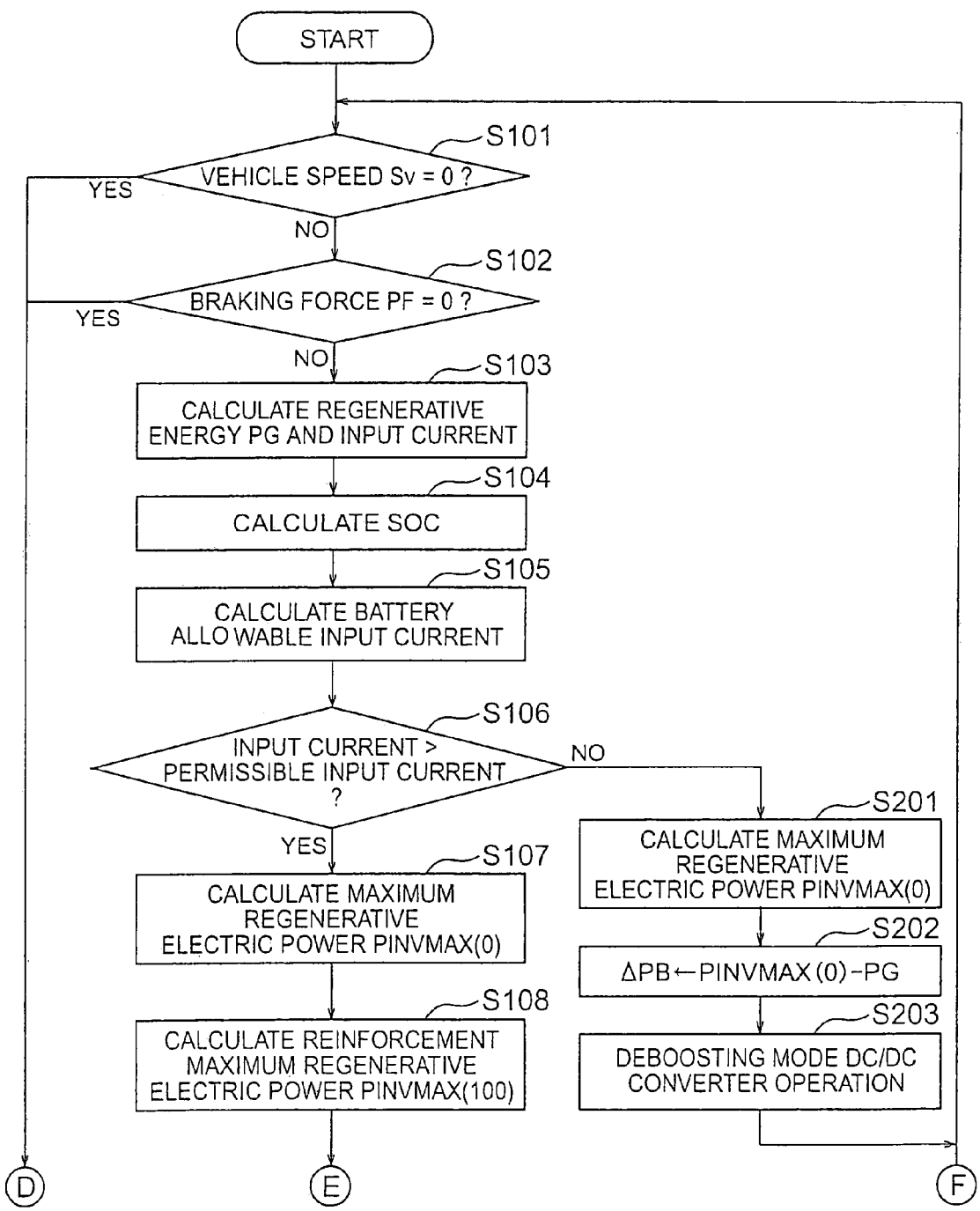
FIG. 18 is a flow chart of regenerative control for a power circuit for a battery according to Embodiment 4 of the present invention.
Figure 19:
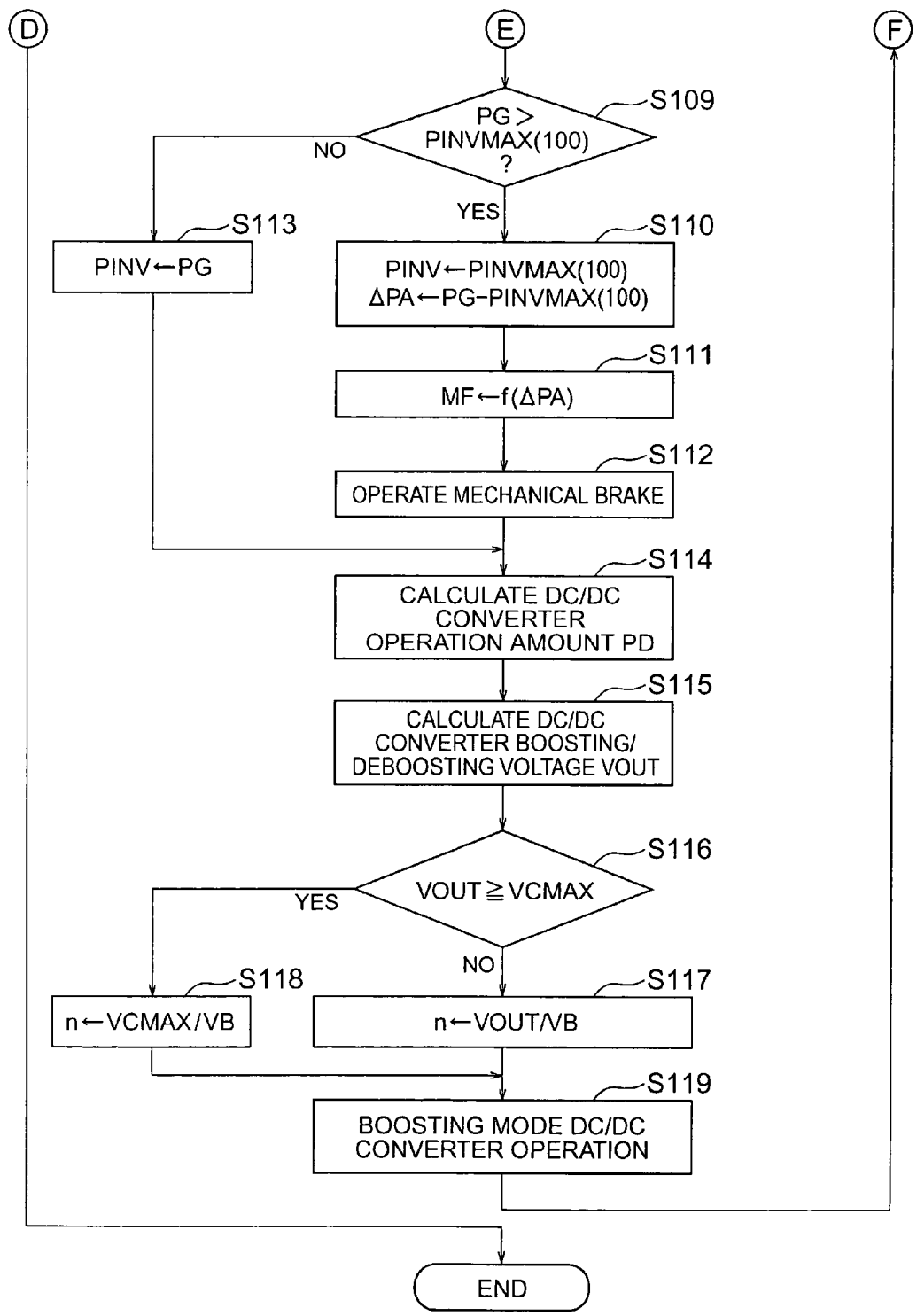
FIG. 19 is a flow chart of regenerative control for the power circuit for a battery according to Embodiment 4 of the present invention.

FIGS. 18 and 19 show a flow chart of regenerative control of a power circuit for a battery according to Embodiment 4 of the present invention. A configuration of the power circuit for a battery according to Embodiment 4 is the same as that of FIGS. 11 and 12. The flow chart of FIGS. 18 and 19 is the same as that of FIGS. 13 and 14 except that Steps S201 to S203 are newly added to the flow chart of FIGS. 13 and 14.

If it is judged in S106 that the input current I is larger than the battery allowable input current IBMAX, then the operation proceeds to S107. On the other hand, if it is judged in S106 that the input current I is equal to or smaller than the battery allowable input current IBMAX, then the operation proceeds to S201.

In S201, similarly to S107, the DC/DC converter control means 16 obtains a maximum regenerative electric power PINVMAX(0).

In S202, the DC/DC converter control means 16 obtains a difference ΔPB between the maximum regenerative electric power PINVMAX(0) and the regenerative energy PG.

In S203, the DC/DC converter control means 16 drives the DC/DC converter on the basis of the difference ΔPB to shift the electric power from the capacitor to the battery in order to charge the battery with electricity (the electric power conversion by the DC/DC converter in this direction is referred to as a deboosting mode DC/DC converter operation).

Figure 20:
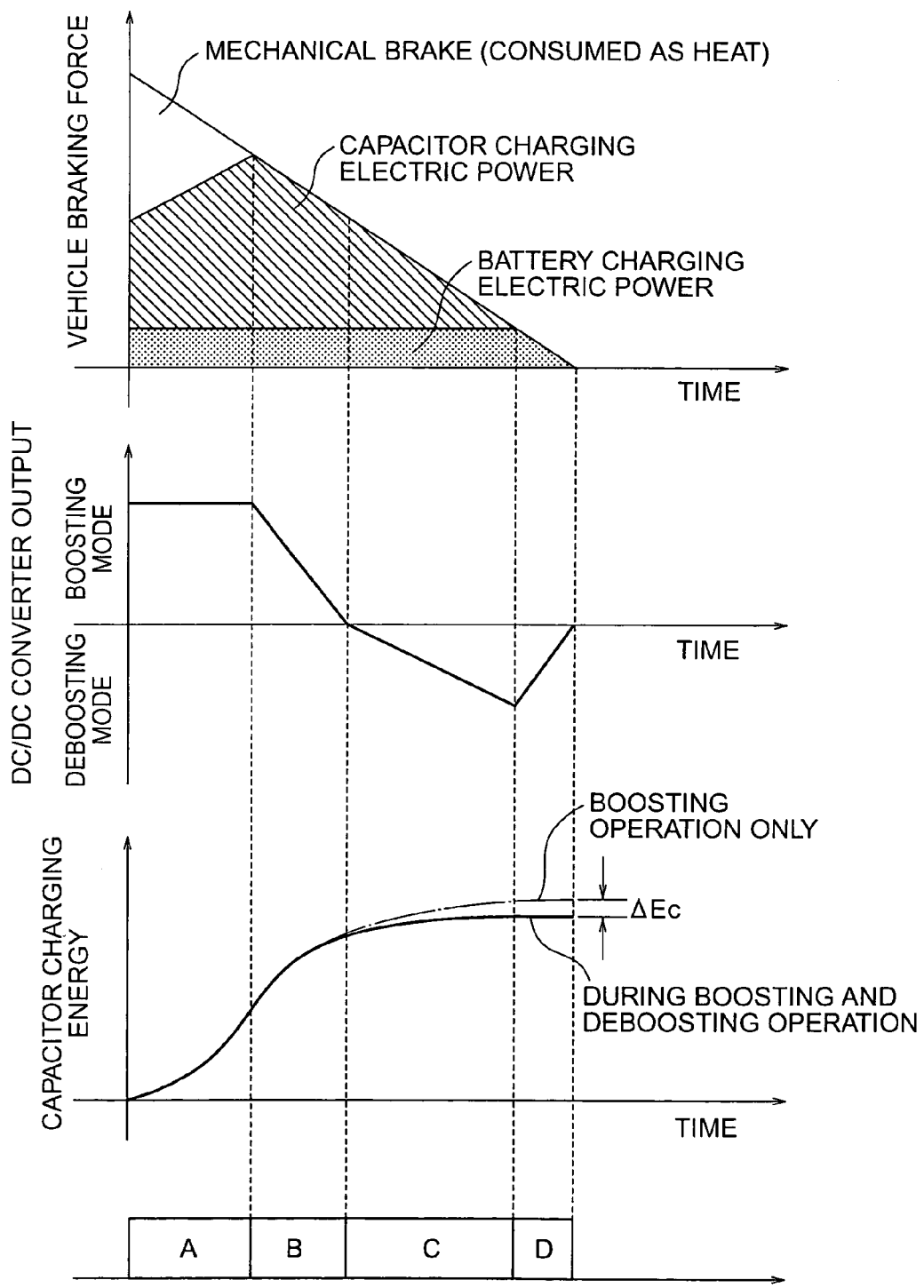
FIG. 20 is a diagram showing how charging is carried out in accordance with the flow chart shown in FIGS. 18 and 19.

Next, a description will hereinafter be given with respect to how charging is carried out while the brake is applied to the vehicle with reference to FIG. 20. A vehicle braking force shown in FIG. 20, for example, is generated when the vehicle is decelerated from a certain speed about at a fixed acceleration.

Sections A and B are the same as those of FIG. 15. In a section C, the DC/DC converter is operated in the deboosting mode to shift the electric power from the capacitor to the battery so that the input current to the battery agrees with the allowable input electric power IBMAX. In a section D, the energy stored in the capacitor does not increase. That is to say, comparing this case with the case of FIG. 15, the energy stored in the capacitor in this case is less than that in the case of FIG. 15 by ΔEc.

This deboosting mode operation makes it possible to reduce a quantity of charge energy for the capacitor as compared with the case in FIG. 15 where the DC/DC converter is not operated in the deboosting mode though a quantity of regenerative energy for the power circuit for a battery is the same as that in the case of FIG. 15. As a result, the capacity of the capacitor can be reduced, and hence the promotion of reduction of the cost becomes possible.

In the power circuit for a battery of the present invention, since when the input electric power to the battery becomes equal to or less than the allowable input electric power, the electric power is transmitted from the capacitor to the battery through the DC/DC converter, a capacitor having a small capacity can be used.

EMBODIMENT 5

Figure 21:
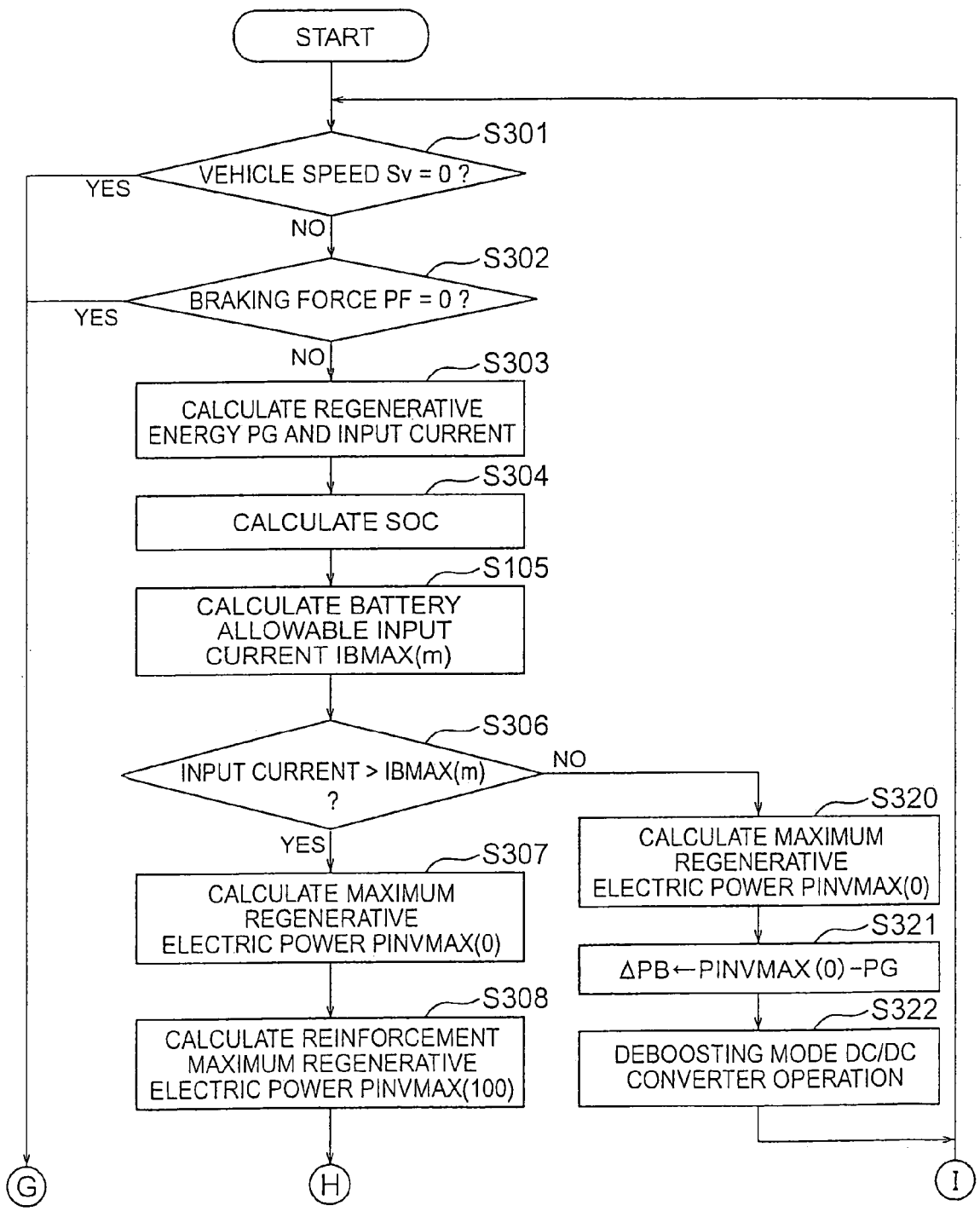
FIG. 21 is a flow chart of regenerative control for a power circuit for a battery according to Embodiment 5 of the present invention.
Figure 22:
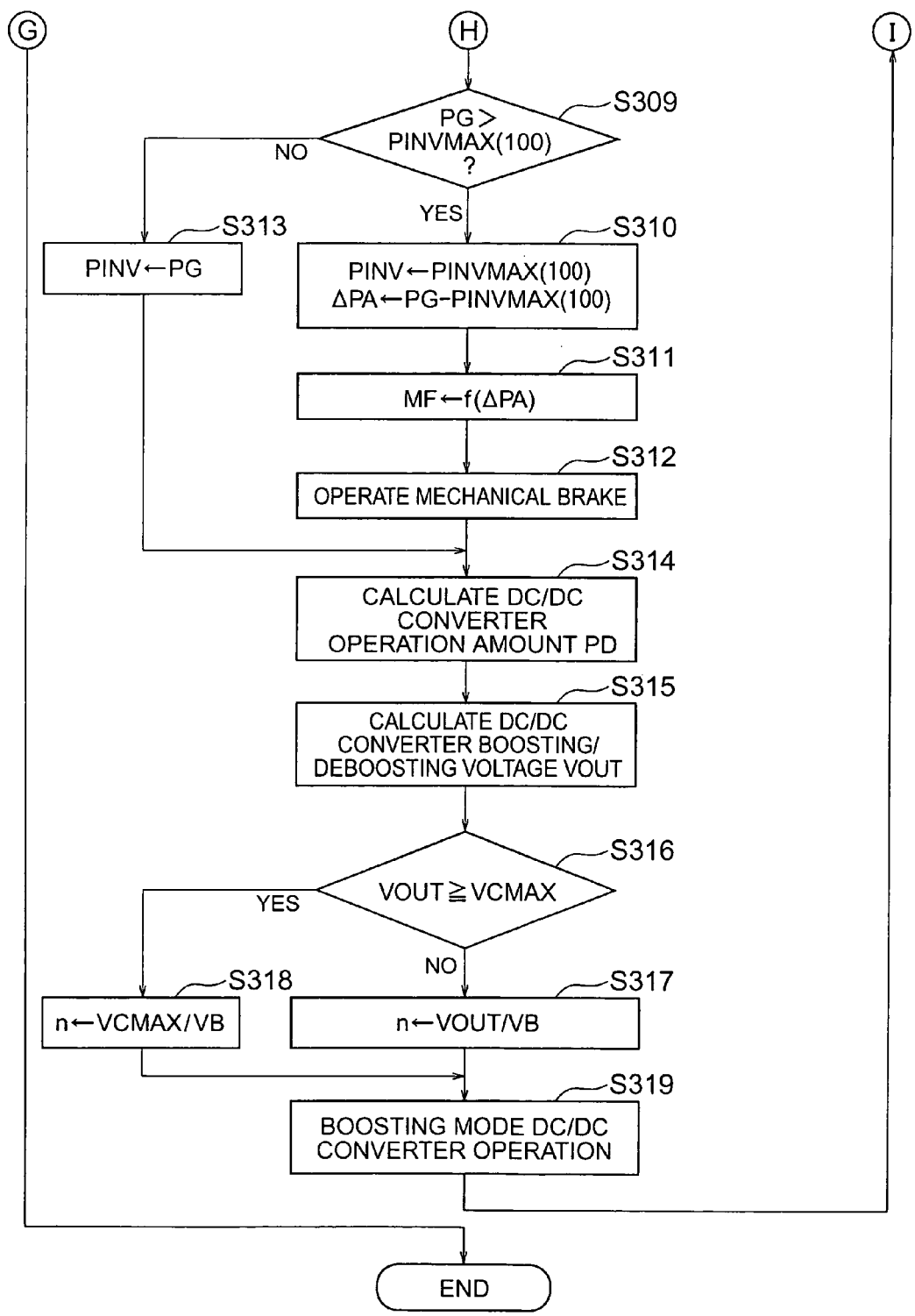
FIG. 22 is a flow chart of regenerative control for the power circuit for a battery according to Embodiment 5 of the present invention.

FIGS. 21 and 22 are a flow chart of regenerative control of a power circuit for a battery according to Embodiment 5 of the present invention. A configuration of the power circuit for a battery according to Embodiment 5 is the same as that of FIGS. 11 and 12. The flow chart of FIGS. 21 and 22 is partially different from that of FIGS. 18 and 19. However, the other constitution of FIGS. 21 and 22 is the same as that of FIGS. 18 and 19. S301 to S304 and S307 to S322 are the same as S101 to S104, S107 to S119, and S201 to S203 of FIGS. 18 and 19. Thus, different Steps are only S305 and S306.

In S305, the input current calculation means 13 calculates a battery allowable input electric power PBMAX(W) on the basis of the battery temperature TB(° C.) and the SOC of the battery. Then, the battery allowable input electric power PBMAX is multiplied by a coefficient m (e.g., m is 0.5) used to obtain a predetermined value to obtain a battery allowable input electric power PBMAX(m) as a predetermined value. Moreover, the input current calculation means 13 obtains a battery allowable input current IBMAX(m) from the battery allowable input electric power PBMAX(m) and the battery terminal voltage VB. Similarly to the battery allowable input electric power PBMAX of Embodiment 3, the battery allowable input electric current PBMAX(m) is used in the processing in and after S307.

In addition, in S306, the input current I is compared with the battery allowable input electric current IBMAX(m). If it is judged in S306 that the input current I is larger than the battery allowable input electric current IBMAX(m), then the operation proceeds to S307. On the other hand, if it is judged in S306 that the input current I is equal to or smaller than the battery allowable input electric current IBMAX(m), then the operation proceeds to S320.

In such a power circuit for a battery, since the input electric power is adjusted to a predetermined value smaller than the battery allowable input electric power, there is room in the input electric power. Since even if an instantaneous regenerative electric power is inputted, there is room in the input electric power, even when a large electric power is instantaneously inputted, the charging can be carried out. In addition, since the predetermined value is adjusted to an electric power with which the degradation of the life can be kept less, the degradation of the first energy storage source is kept less.

Note that while in Embodiment 5, 0.5 is set as the coefficient used to obtain the predetermined value, the same effects can be obtained as long as the coefficient falls within the range of 0.3 to 0.8.

EMBODIMENT 6

Figure 23:
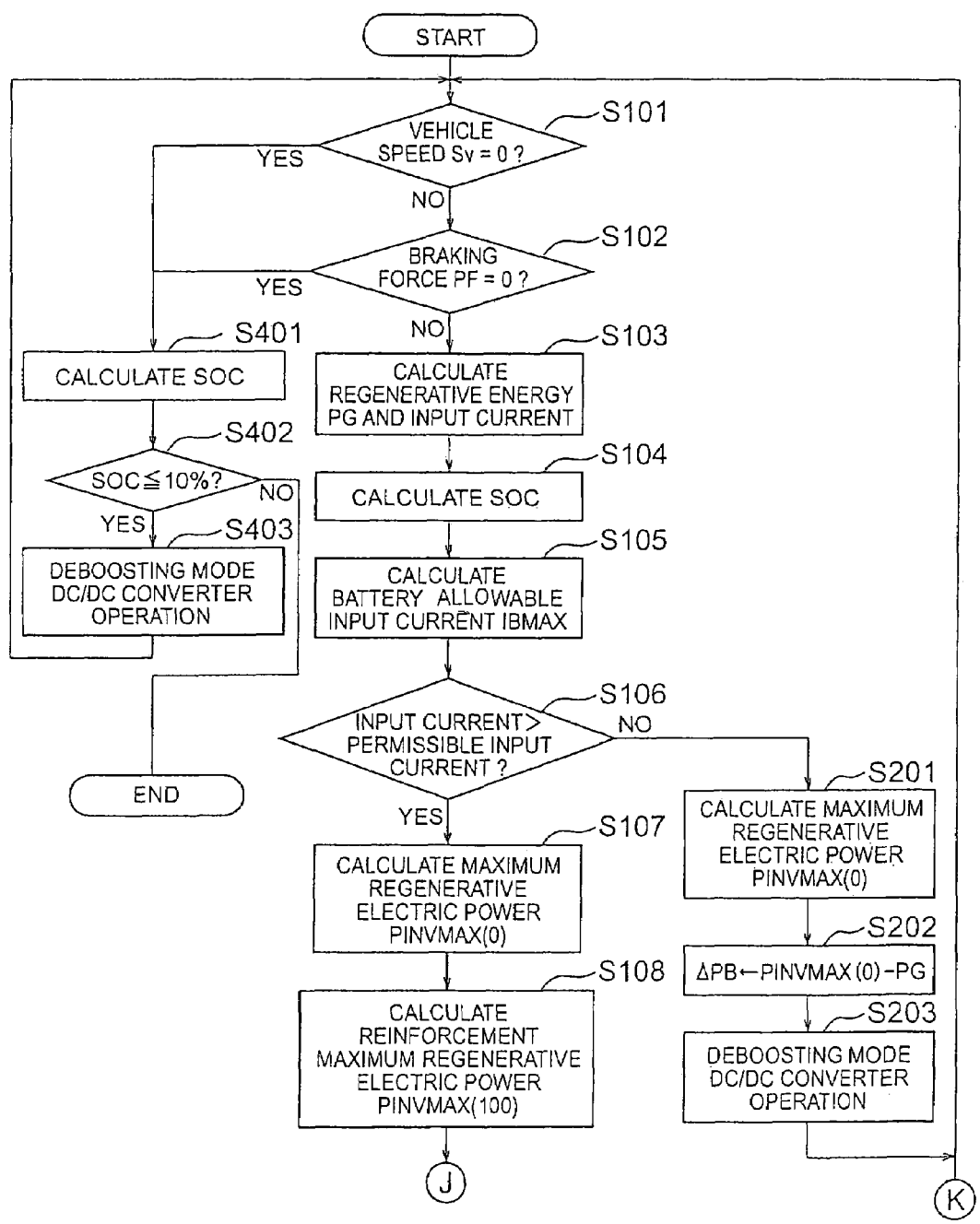
FIG. 23 is a flow chart of regenerative control for a power circuit for a battery according to Embodiment 6 of the present invention.
Figure 24:
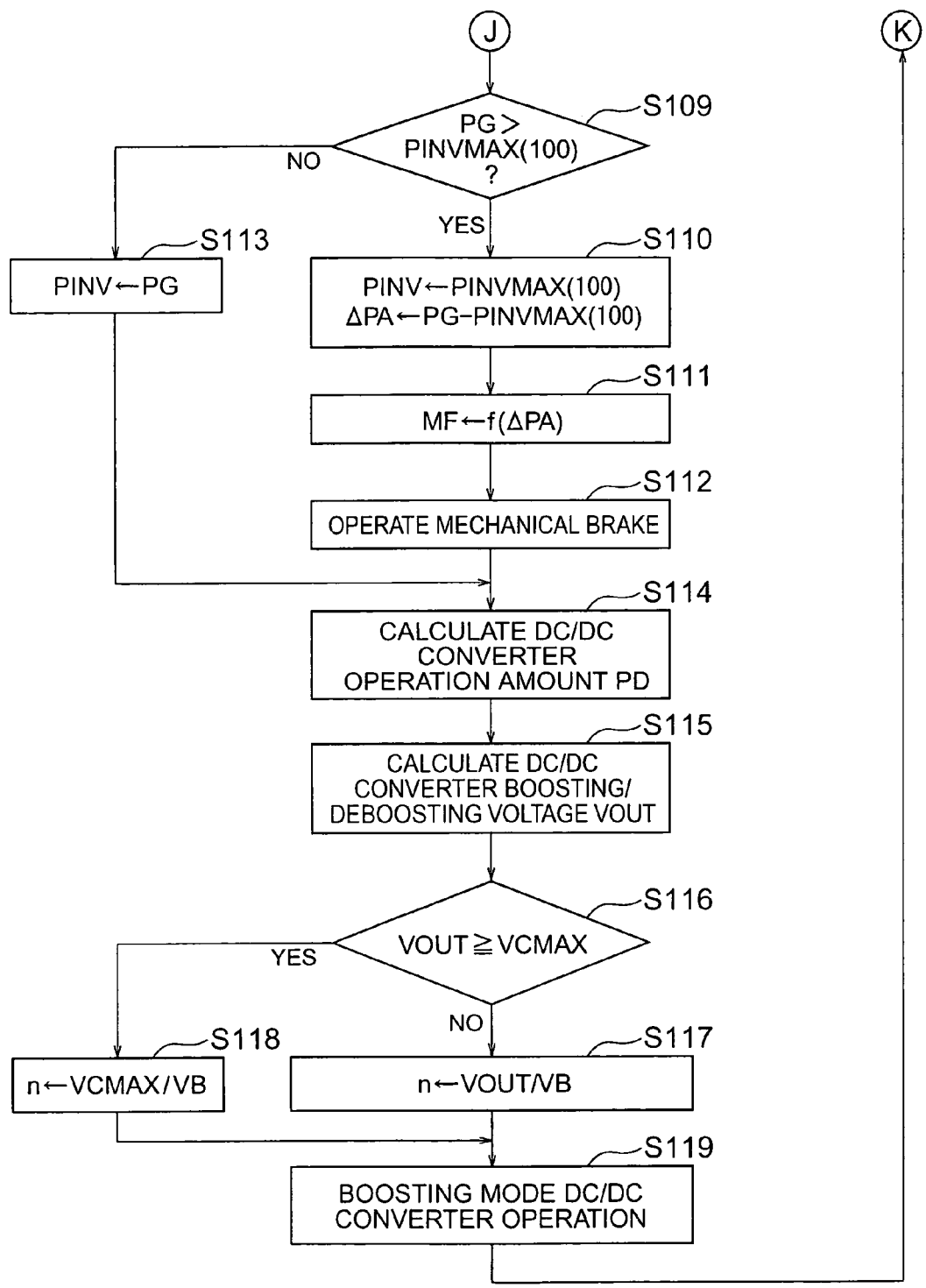
FIG. 24 is a flow chart of regenerative control for the power circuit for a battery according to Embodiment 6 of the present invention.

FIGS. 23 and 24 are a flow chart of regenerative control of a power circuit for a battery according to Embodiment 6 of the present invention. A configuration of the power circuit for a battery according to Embodiment 6 is the same as that of FIGS. 11 and 12. The flow chart of FIGS. 23 and 24 is the same as that of FIGS. 18 and 19 except that new steps are added to the flow chart of FIGS. 18 and 19.

In the flow chart of FIGS. 18 and 19, when the vehicle speed Sv is zero, or the braking force PF is zero, the regenerative control is completed. On the other hand, in the flow chart of FIGS. 23 and 24, when in S101, the vehicle speed Sv is zero, or in S102, the braking force PF is zero, the operation proceeds to S401. In S401, the SOC(%) of the battery is obtained on the basis of the battery terminal voltage VB(V). In S402, it is judged whether or not the SOC of the battery is equal to or smaller than a preset threshold of 10%. If it is judged in S402 that the SOC of the battery is equal to or smaller than the preset threshold of 10%, then the operation proceeds to S403. On the other hand, if it is judged in S402 that the SOC of the battery exceeds the preset threshold of 10%, then the regenerative control is completed. In S403, the DC/DC converter is driven to shift the electric power from the capacitor to the battery in order to charge the battery with electricity (the conversion of the electric power by the DC/DC converter in this direction is referred to as a deboosting DC/DC converter operation).

In such a power circuit for a battery, when the SOC of the battery reaches the vicinity of a preset threshold, i.e., a lower limit value of the allowable SOC, the electric power is shifted from the capacitor to the battery in order to charge the battery with electricity. Hence, it is prevented that the SOC of the battery is remarkably reduced and under this condition, the over-discharge state continues. Thus the life of the battery is lengthened.

Note that while in Embodiment 6, when the SOC becomes equal to or smaller than the threshold of 10%, the electric power is shifted from the capacitor to the battery in order to charge the battery with electricity, even when a value in the range of about 5 to about 20% is set as the threshold, the same effects can be obtained.

INDUSTRIAL APPLICABILITY

As set forth hereinabove, the power circuit for a battery can be utilized for a hybrid automobile or the like having both an internal combustion engine and an electric motor. Since the braking energy is more regenerated with the electrical brake on be stored in the energy storage source, the rate of fuel consumption is improved.

The invention claimed is:

1. A power control circuit for supplying power to an electric motor that is coupled to an engine, the circuit comprising:
   a battery as a first energy storage source;
   a capacitor as a second energy storage source connected in series with the first energy storage source;
   a DC/DC converter for converting electric power supplied to the first energy storage source and the second energy storage source; and
   control means for controlling the DC/DC converter, wherein the control means
   detects voltage of the one of the first and second energy storage sources that is disposed on a high voltage side, as the high voltage side energy storage source, and
   when the voltage detected is lower than a first threshold voltage, causes the high voltage side energy storage source to be charged through the DC/DC converter.

2. The power control circuit according to claim 1, wherein the control means detects the voltage of the high voltage side energy storage source, and, when the voltage detected is lower than the first threshold voltage, keeps the engine running and does not perform an engine stopping operation.

3. The power control circuit according to claim 1, wherein the control means detects the voltage of the high voltage side energy storage source, and, when the voltage detected is lower than the first threshold voltage, charges the high voltage side energy storage source through the DC/DC converter while keeping the engine running, and, when the voltage detected is higher than the first threshold voltage, stops the engine.

4. The power control circuit according to claim 1, wherein the control means detects voltage of the first energy storage source and voltage of the second energy storage source, and adjusts the first threshold voltage in accordance with the voltage of the one of the first and second energy storage sources that is disposed on a low voltage side.

5. A power control circuit for supplying power to an electric motor that is coupled to an engine, through an electric conversion circuit, the control circuit comprising:
   a battery as a first energy storage source;
   a capacitor as a second energy storage source connected in series with the first energy storage source;
   a DC/DC converter for converting electric power supplied to the first energy storage source and the second energy storage source; and
   control means for controlling the DC/DC converter, wherein, when the electric motor while in a stop state is started, the control means detects a voltage of the one of the first and second energy storage sources that is disposed on a high voltage side, as the high voltage side energy storage source, and adjusts electric power output by the DC/DC converter in accordance with the voltage detected.

6. The power control circuit according to claim 5, wherein the control means detects voltage of the one of the first and second energy storage sources that is disposed on a low voltage side, as the low voltage side energy storage source, and, when the voltage detected at the low voltage side energy storage source is no larger than a second threshold voltage, controls output of the DC/DC converter so that current of the low voltage side energy storage source is minimized.

7. The power control circuit according to claim 1, wherein the control means detects voltage of the one of the first and second energy storage sources disposed on a low voltage side, as the low voltage side energy storage source, and, when the voltage detected at the low voltage side energy storage source is smaller than a second threshold voltage, increases the first threshold voltage.

* * * * *